US008773368B2

(12) United States Patent
Senda et al.

(10) Patent No.: US 8,773,368 B2
(45) Date of Patent: Jul. 8, 2014

(54) INFORMATION INPUT DEVICE, INFORMATION INPUT/OUTPUT DEVICE AND ELECTRONIC DEVICE

(75) Inventors: Michiru Senda, Kanagawa (JP); Yoshiharu Nakajima, Kanagawa (JP); Tsutomu Harada, Aichi (JP); Go Yamanaka, Kanagawa (JP); Daisuke Takama, Aichi (JP)

(73) Assignee: Japan Display West, Inc., Chita (JP)

( * ) Notice: Subject to any disclaimer, the term of this patent is extended or adjusted under 35 U.S.C. 154(b) by 893 days.

(21) Appl. No.: 12/685,846

(22) Filed: Jan. 12, 2010

(65) Prior Publication Data

US 2010/0271321 A1    Oct. 28, 2010

(30) Foreign Application Priority Data

Jan. 30, 2009 (JP) ................... 2009-020676
Dec. 8, 2009 (JP) ................... 2009-278818

(51) Int. Cl.
*G06F 3/041* (2006.01)

(52) U.S. Cl.
USPC ........................ 345/173; 178/18.11

(58) Field of Classification Search
USPC ................ 345/104, 173–178, 207; 178/18.01–18.11
See application file for complete search history.

(56) References Cited

U.S. PATENT DOCUMENTS 6,188,489 B1 * 2/2001 Kanamori .................. 358/1.16
6,191,408 B1 * 2/2001 Shinotsuka et al. ....... 250/208.1
7,190,336 B2   3/2007 Fujisawa
2004/0095402 A1 * 5/2004 Nakano .................... 346/102
2006/0244693 A1 * 11/2006 Yamaguchi et al. ......... 345/76
2008/0291150 A1   11/2008 Yang et al.
2009/0002341 A1   1/2009 Saito et al.
2010/0013813 A1   1/2010 Katoh et al.

FOREIGN PATENT DOCUMENTS

| JP | HEI 2004 127272 |   | 4/2004 |
| JP | 2007-018458 |   | 1/2007 |
| JP | 2007-102154 |   | 4/2007 |
| JP | 2007102728 A | * | 4/2007 |
| WO | WO 2008/126872 A1 |   | 10/2008 |

* cited by examiner

*Primary Examiner* — Amare Mengistu
*Assistant Examiner* — Jennifer Zubajlo
(74) *Attorney, Agent, or Firm* — Robert J. Depke; The Chicago Technology Law Group, LLC

(57) ABSTRACT

An information input device includes an input panel including an illumination light source, a plurality of first light-receiving elements and one or more second light-receiving elements, the illumination light source emitting detection light for detecting an external proximity object, the plurality of first light-receiving elements receiving detection light emitted from the illumination light source and then reflected from the external proximity object, the second light-receiving elements for monitoring the intensity of the detection light; a correction section performing adaptive sensitivity correction on light-receiving signals obtained by the first light-receiving elements through use of an intensity monitor signal of detection light obtained by the second light-receiving element; and an image processing section obtaining object information about one or more of the position, shape and size of the external proximity object based on a picked-up image obtained from the light-receiving signals subjected to the sensitivity correction by the correction section.

22 Claims, 34 Drawing Sheets

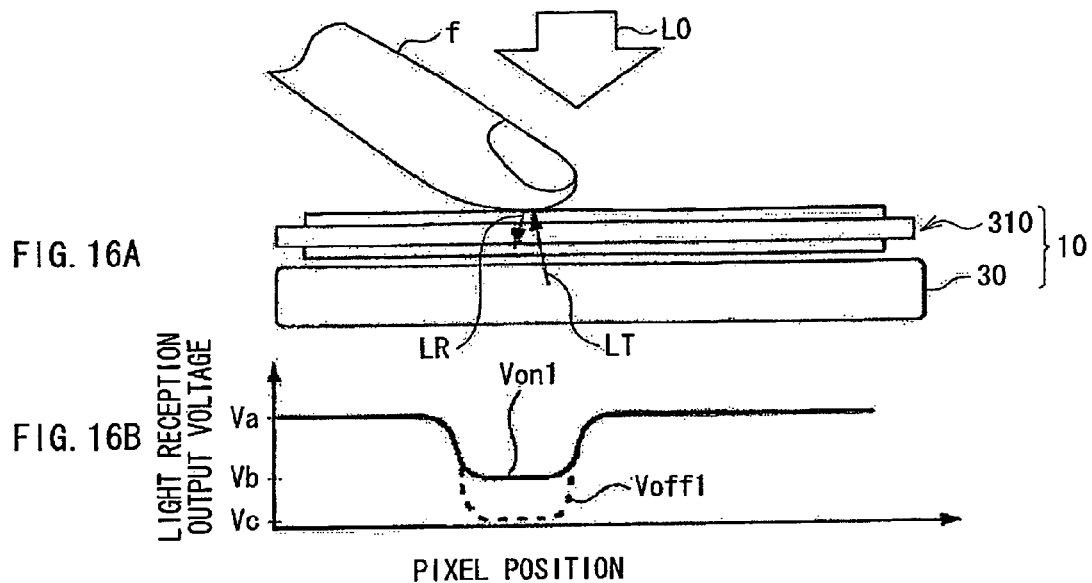
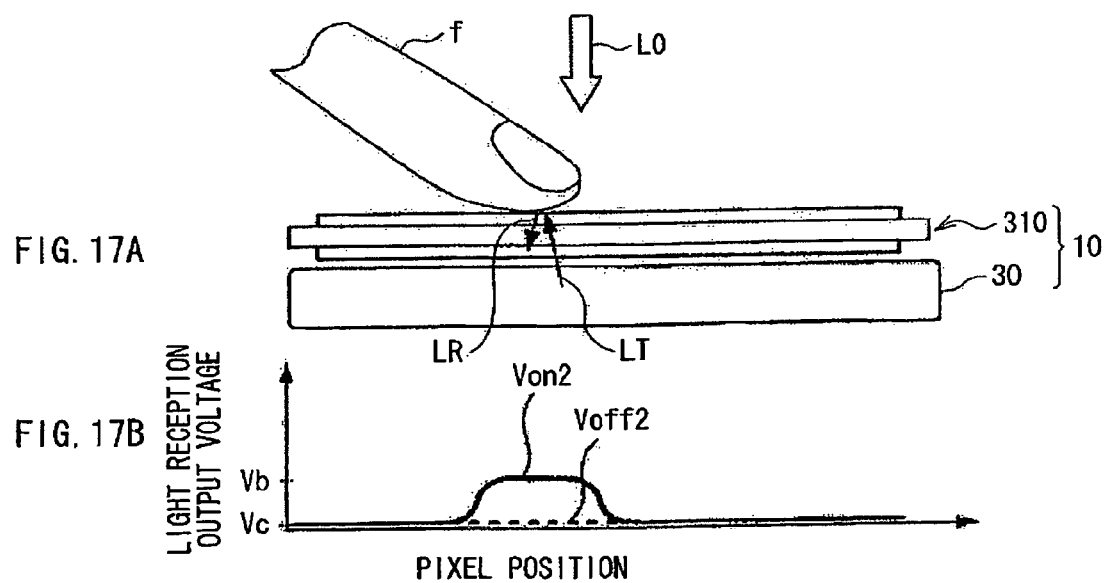

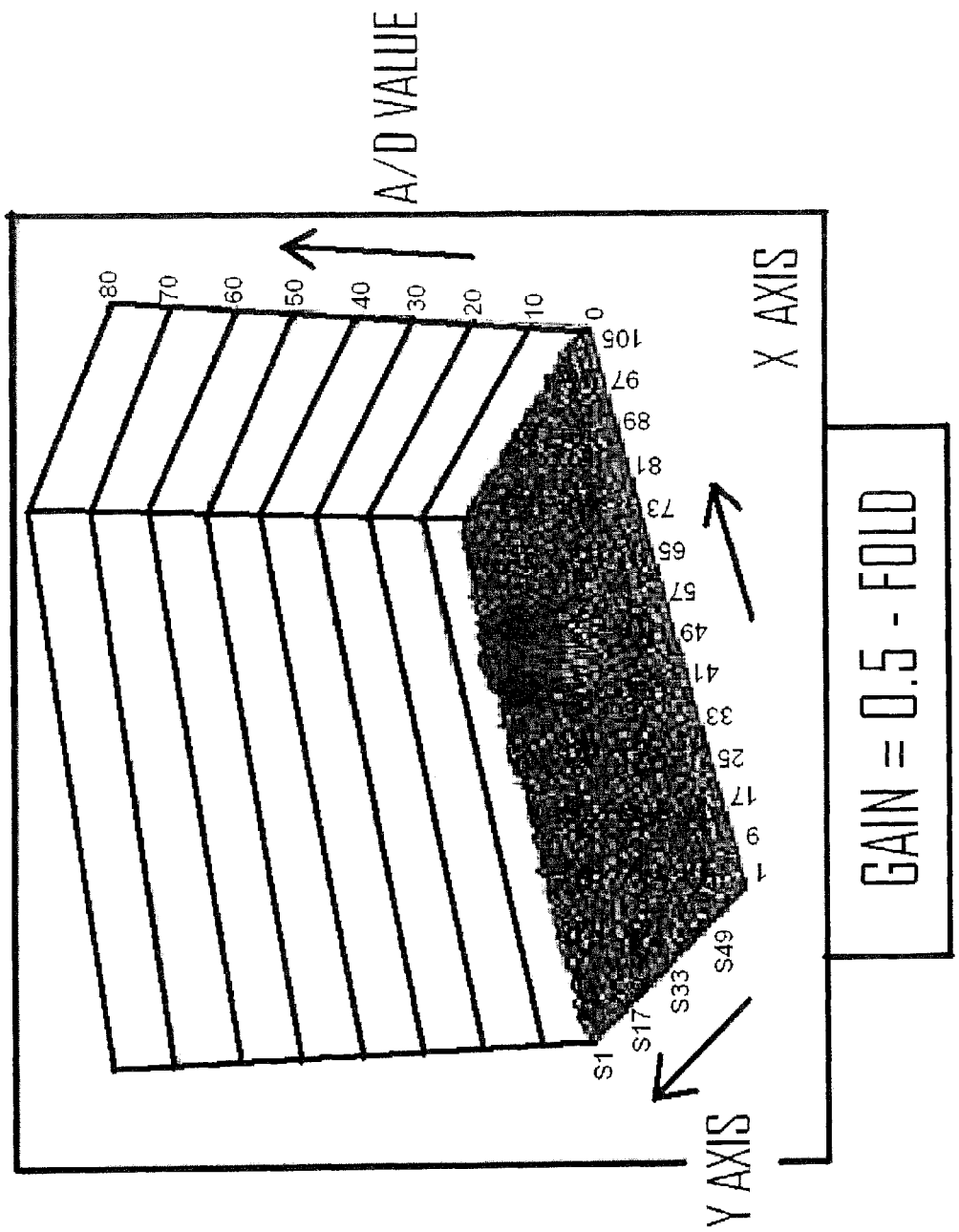

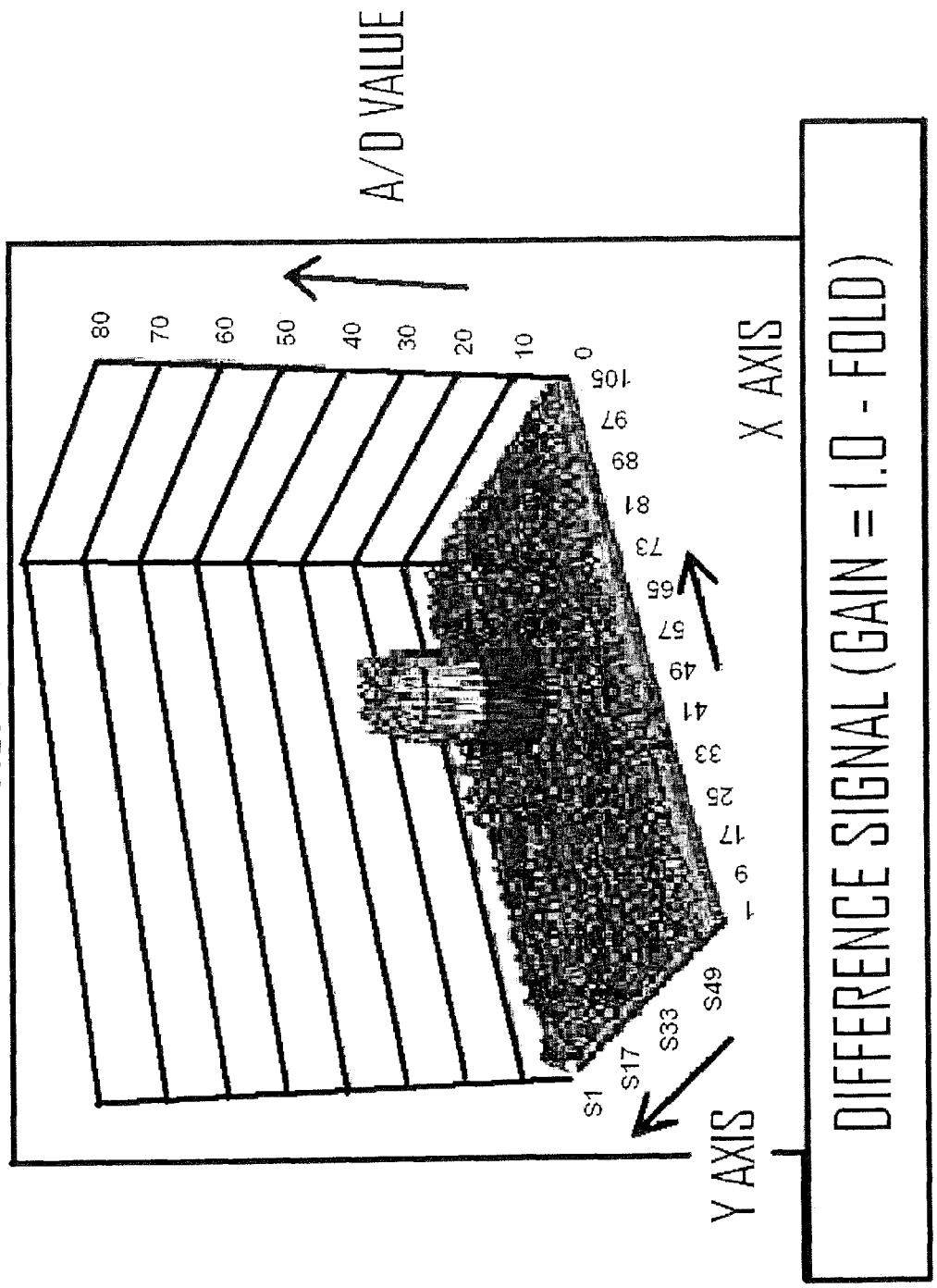

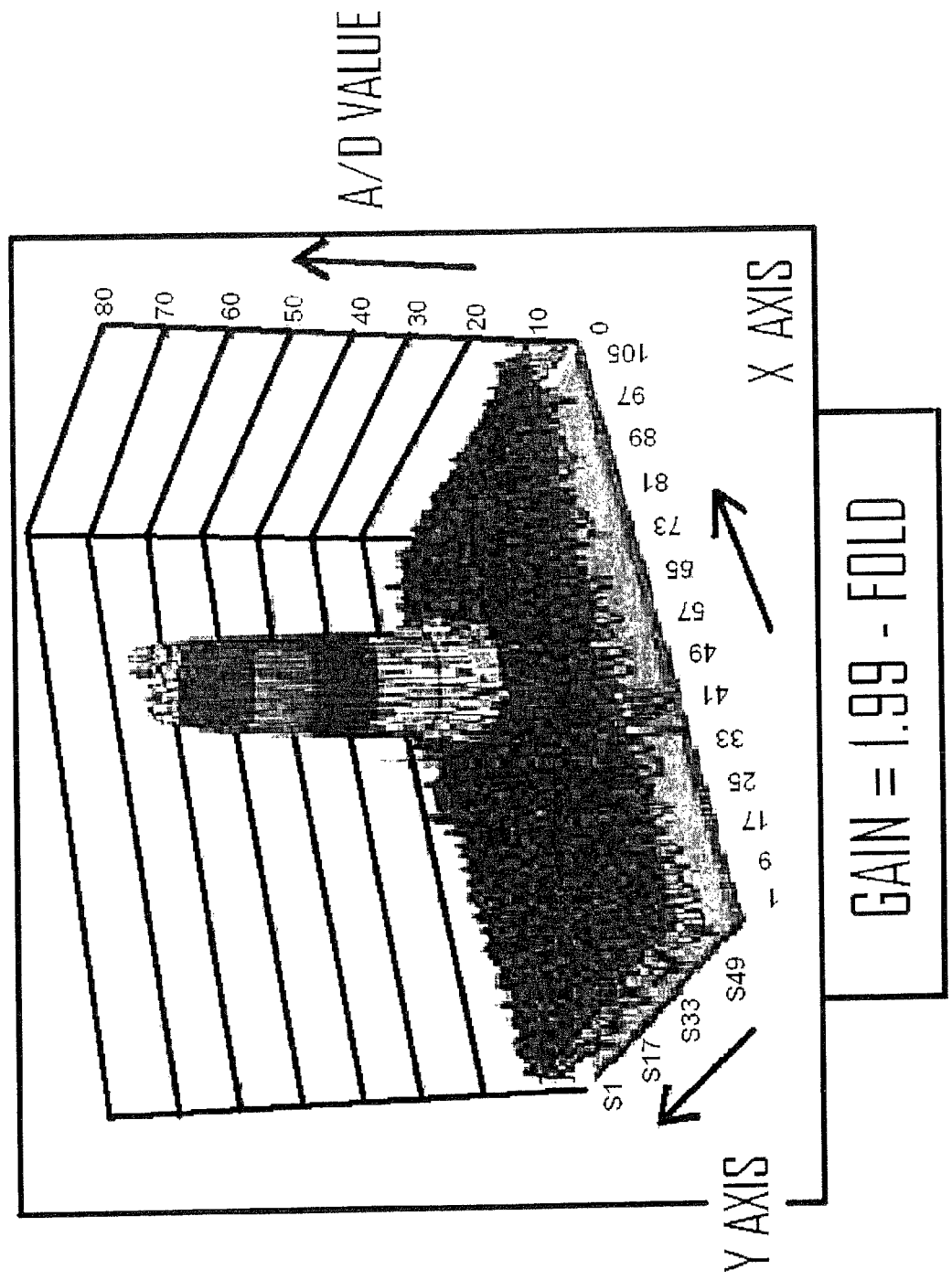

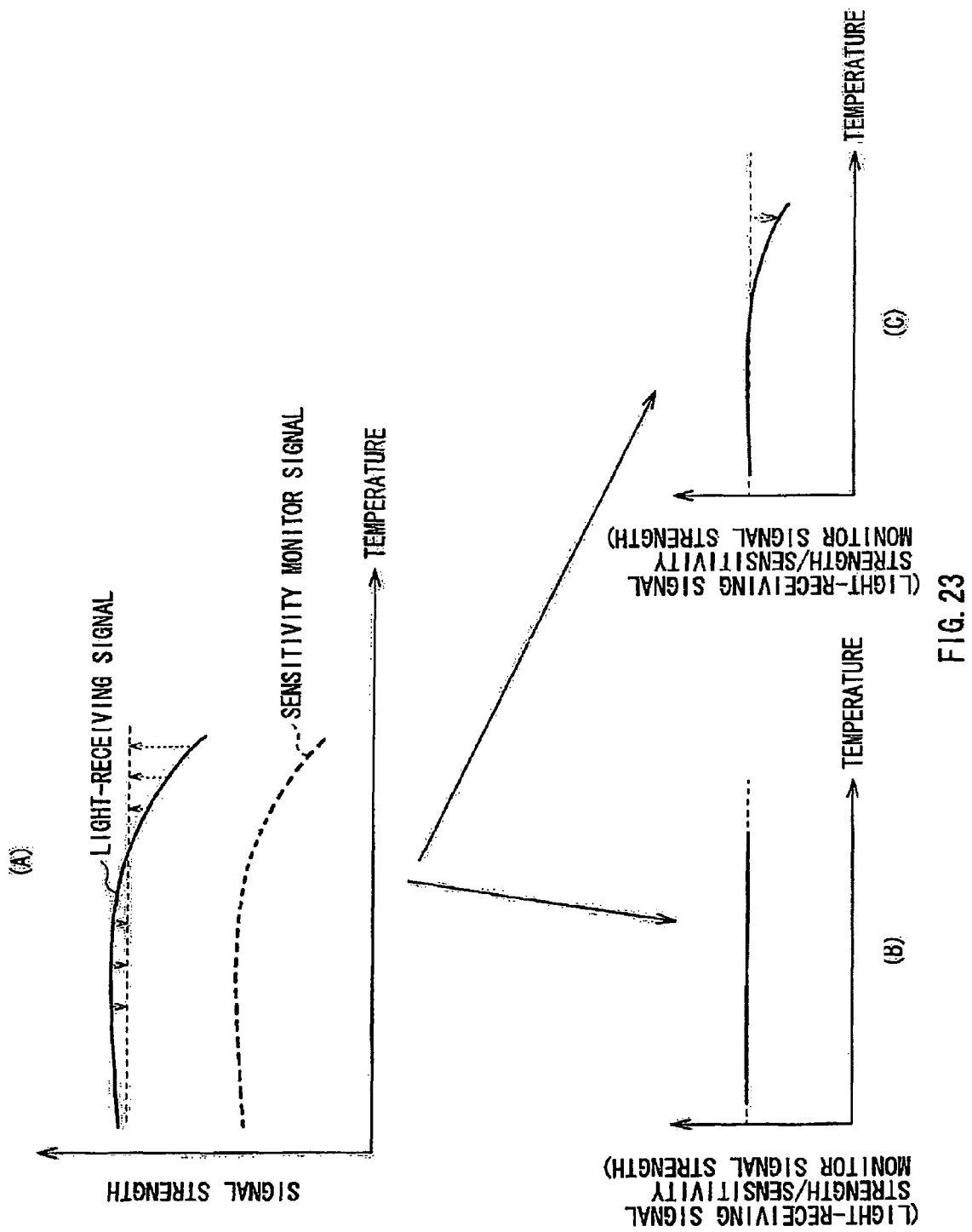

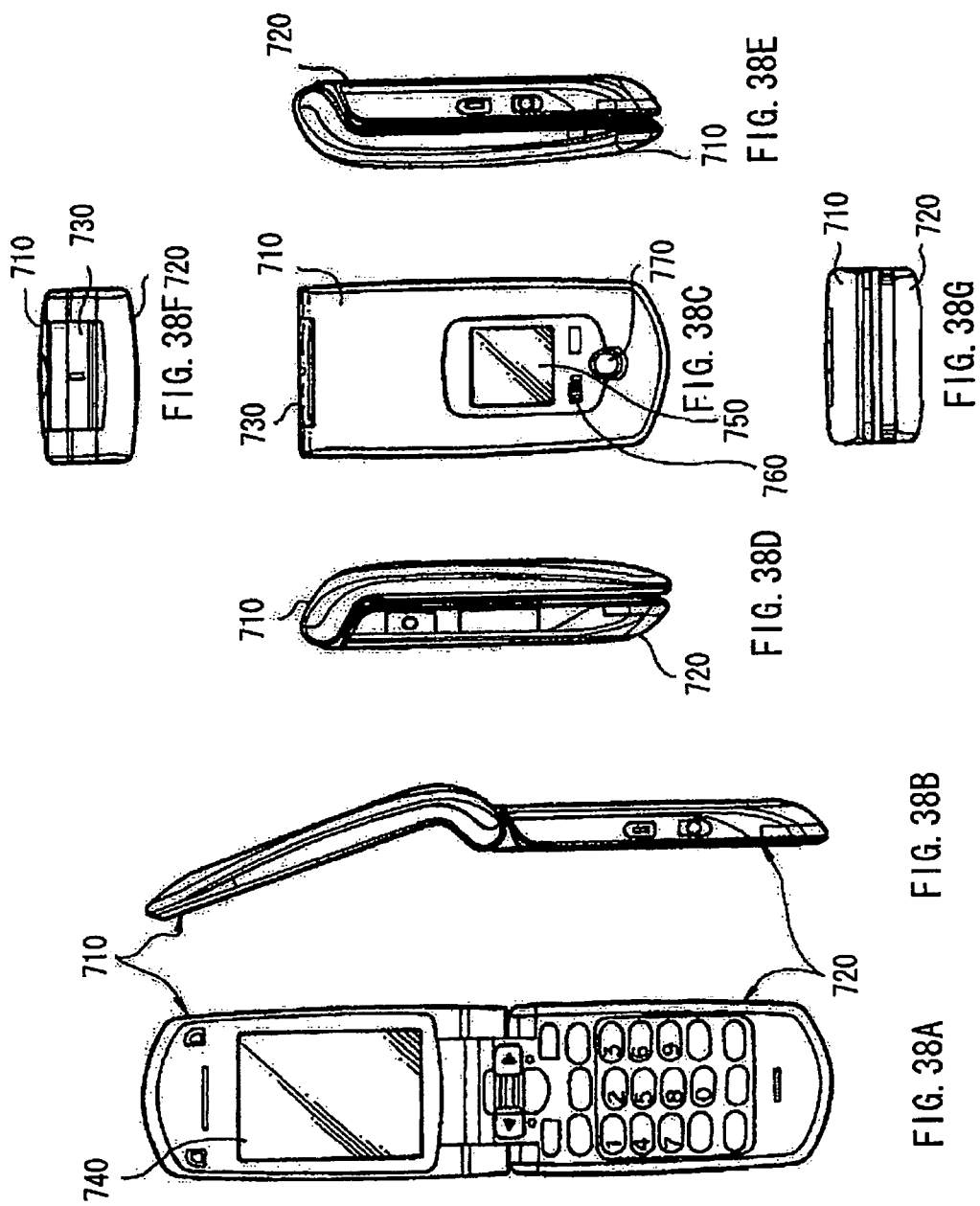

INFORMATION INPUT DEVICE, INFORMATION INPUT/OUTPUT DEVICE AND ELECTRONIC DEVICE

The present application claims priority to Japanese Patent Application JP 2009-020676 filed in the Japanese Patent Office on Jan. 30, 2009, and Japanese Patent Application JP 2009-278818 filed in the Japanese Patent Office on Dec. 8, 2009, the entire content of all is hereby incorporated by reference.

BACKGROUND OF THE INVENTION

1. Field of the Invention

The present invention relates to an information input device and an information input/output device performing a process in response to an input of information about an external proximity object, and an electronic device including such an information input device.

2. Description of the Related Art

Some image displays include touch panels. Types of touch panels include an optical type touch panel optically detecting a finger or the like in addition to a resistance type touch panel using a change in electrical resistance and a capacitance type touch panel using a change in capacitance.

For example, in the optical type touch panel, an image is displayed on a display surface thereof by modulating light from a backlight in a liquid crystal element, and light emitted from the display surface and then reflected from a proximity object such as a finger is received by light-receiving elements arranged on the display surface so as to detect the position or the like of the proximity object. Japanese Unexamined Patent Application Publication No. 2004-127272 discloses such an image display. The display disclosed in Japanese Unexamined Patent Application Publication No. 2004-127272 includes a display section including a display means for displaying an image and an image-pickup means for picking up an image of an object.

SUMMARY OF THE INVENTION

In the above-described image display, light emitted from the display means and then reflected from an external proximity object to return to the display means is detected by light-receiving elements. However, in such light-receiving elements, light reception sensitivity changes due to, for example, time-dependent degradation in members (such as a panel and a backlight) of the display or the light-receiving elements. Moreover, light reception sensitivity of light-receiving elements varies from display to display. Therefore, in some cases, it is difficult to obtain uniform intensities of light-receiving signals obtained from the light-receiving elements, even though the light-receiving signals from a single proximity object are obtained.

Therefore, in the case where a proximity object is detected in response to such light-receiving signals, it is difficult to accurately detect the proximity object, and a position detection error or the like may arise. In other words, in an information input device including an optical type touch panel in related art, it is difficult to detect a finger or the like with high accuracy, and there is room for improvement.

It is desirable to provide an information input device, an information input/output device and an electronic device which are allowed to detect a proximity object such as a finger with high accuracy.

According to an embodiment of the invention, there is provided an information input device including: an input panel including an illumination light source, a plurality of first light-receiving elements and one or more second light-receiving elements, the illumination light source emitting detection light for detecting an external proximity object, the plurality of first light-receiving elements receiving detection light emitted from the illumination light source and then reflected from the external proximity object, the second light-receiving elements for monitoring the intensity of the detection light; a correction section performing adaptive sensitivity correction on light-receiving signals obtained by the first light-receiving elements through use of an intensity monitor signal of detection light obtained by the second light-receiving element; and an image processing section obtaining object information about one or more of the position, shape and size of the external proximity object based on a picked-up image obtained from the light-receiving signals subjected to the sensitivity correction by the correction section.

According to an embodiment of the invention, there is provided an information input/output device including: an input/output panel including a plurality of display elements arranged in a display surface, a plurality of first light-receiving elements and one or more second light-receiving elements, the plurality of first light-receiving elements arranged in the display surface and receiving detection light emitted from the display surface and then reflected from an external proximity object, the second light-receiving elements for monitoring the intensity of the detection light; a correction section performing adaptive sensitivity correction on light-receiving signals obtained by the first light-receiving elements through use of an intensity monitor signal of detection light obtained by the second light-receiving element; and an image processing section obtaining object information about one or more of the position, shape and size of the external proximity object based on a picked-up image obtained from the light-receiving signals subjected to the sensitivity correction by the correction section.

According to an embodiment of the invention, an electronic device including the above-described information input device.

In the information input device, the information input/output device and the electronic device according to the embodiment of the invention, detection light emitted from the illumination light source or the display surface and then reflected from the external proximity object is received by the first light-receiving elements so as to obtain light-receiving signals. Moreover, the intensity of the detection light is monitored by the second light-receiving element so as to obtain an intensity monitor signal. Then, adaptive sensitivity correction is performed on the light-receiving signals obtained from the first light-receiving elements using the intensity monitor signal. Thereby, even in the case where a change in light reception sensitivity caused by time-dependent degradation or the like in the illumination light source (display elements) or light-receiving elements as members of the input panel or individual variations in light reception sensitivity among the light-receiving elements occur, light-receiving signals with a uniform intensity are obtainable from a single external proximity object.

In the information input device, the information input/output device and the electronic device according to the embodiment of the invention, adaptive sensitivity correction is performed on light-receiving signals obtained from the first light-receiving elements using the intensity monitor signal of the detection light obtained from the second light-receiving element. Therefore, even if a change in light reception sensitivity caused by time-dependent degradation or the like or individual variations in light reception sensitivity occur, light-receiving signals with a uniform intensity is obtainable from a single external proximity object. Therefore, object information about the external proximity object is obtained based on the light-receiving signals subjected to such sensitivity correction, thereby a proximity object such as a finger is detectable with high accuracy.

Other and further objects, features and advantages of the invention will appear more fully from the following description.

BRIEF DESCRIPTION OF THE DRAWINGS

FIGS. 16A and 16B are illustrations for describing generation of a difference signal in the case where outside light is bright.

FIGS. 17A and 17B are illustration for describing generation of a difference signal in the case where outside light is dark.

FIGS. 18A to 18D are plots illustrating an example of signal intensity distributions when the sensitivity correction gain is changed.

FIG. 23 is a plot of an example of a relationship between temperature and signal intensities of a light-receiving signal and a sensitivity monitor signal.

FIGS. 38A to 38G illustrate Application Example 5, FIGS. 38A and 38B are a front view and a side view in a state in which Application Example 5 is opened, respectively, and FIGS. 38C, 38D, 38E, 38F and 38G are a front view, a left side view, a right side view, a top view and a bottom view in a state in which Application Example 5 is closed, respectively.

DETAILED DESCRIPTION OF THE PREFERRED EMBODIMENTS

Preferred embodiments will be described in detail below referring to the accompanying drawings. Descriptions will be given in the following order.

Figure 1:
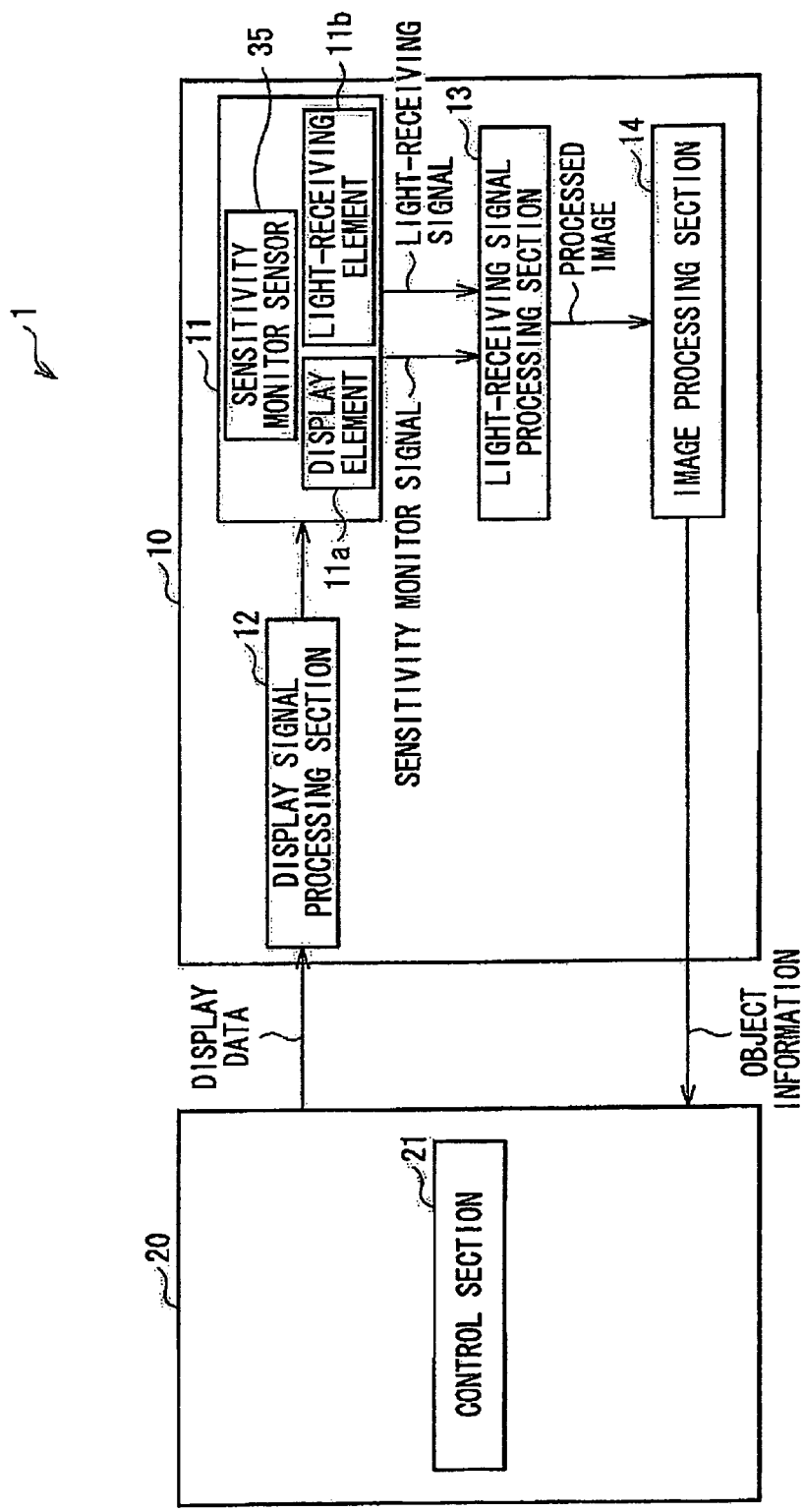
FIG. 1 is a block diagram of a configuration of an information input/output device according to a first embodiment of the invention.
Figure 2:
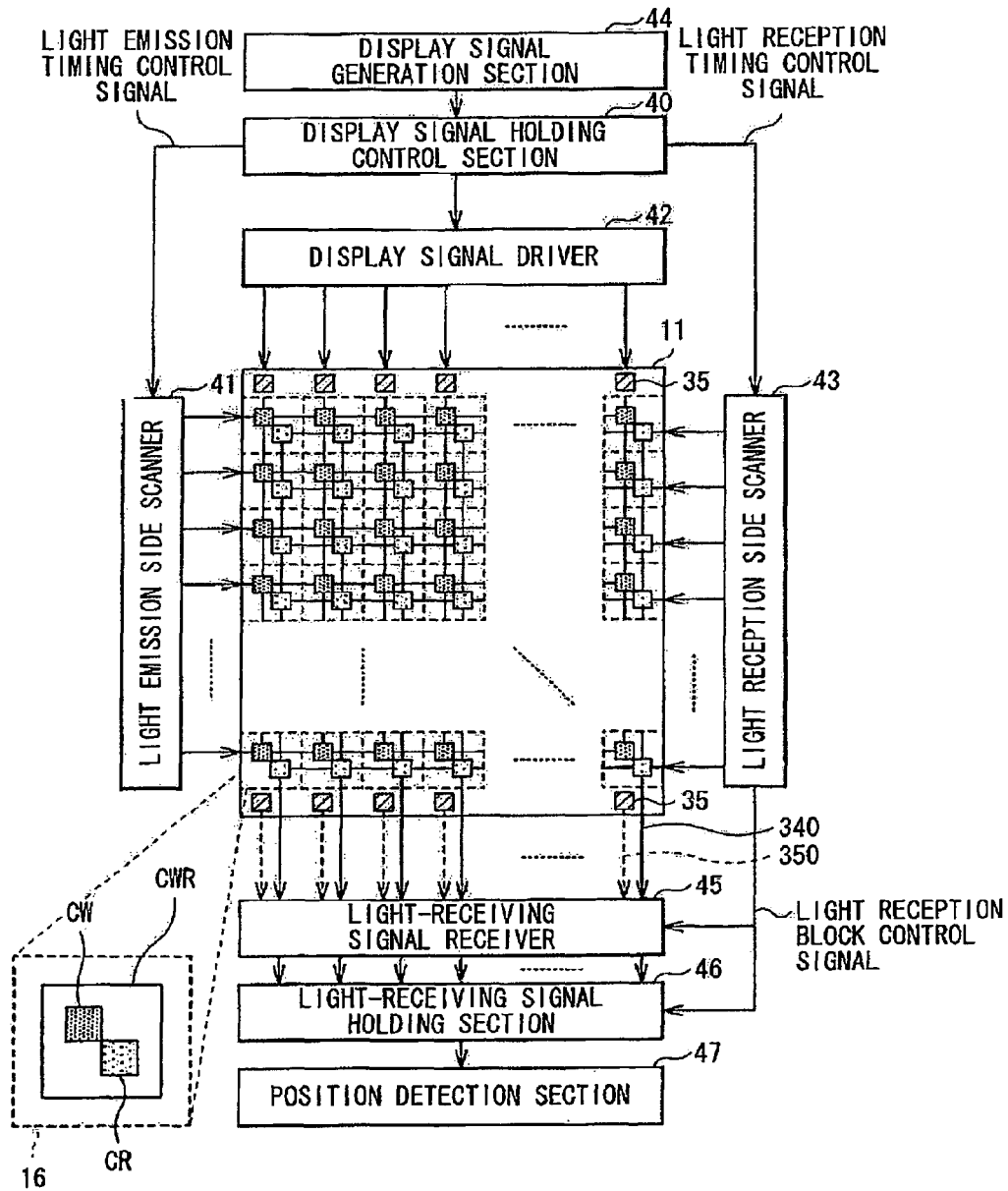
FIG. 2 is a block diagram of a more specific configuration of the information input/output device illustrated in FIG. 1.
Figure 3:
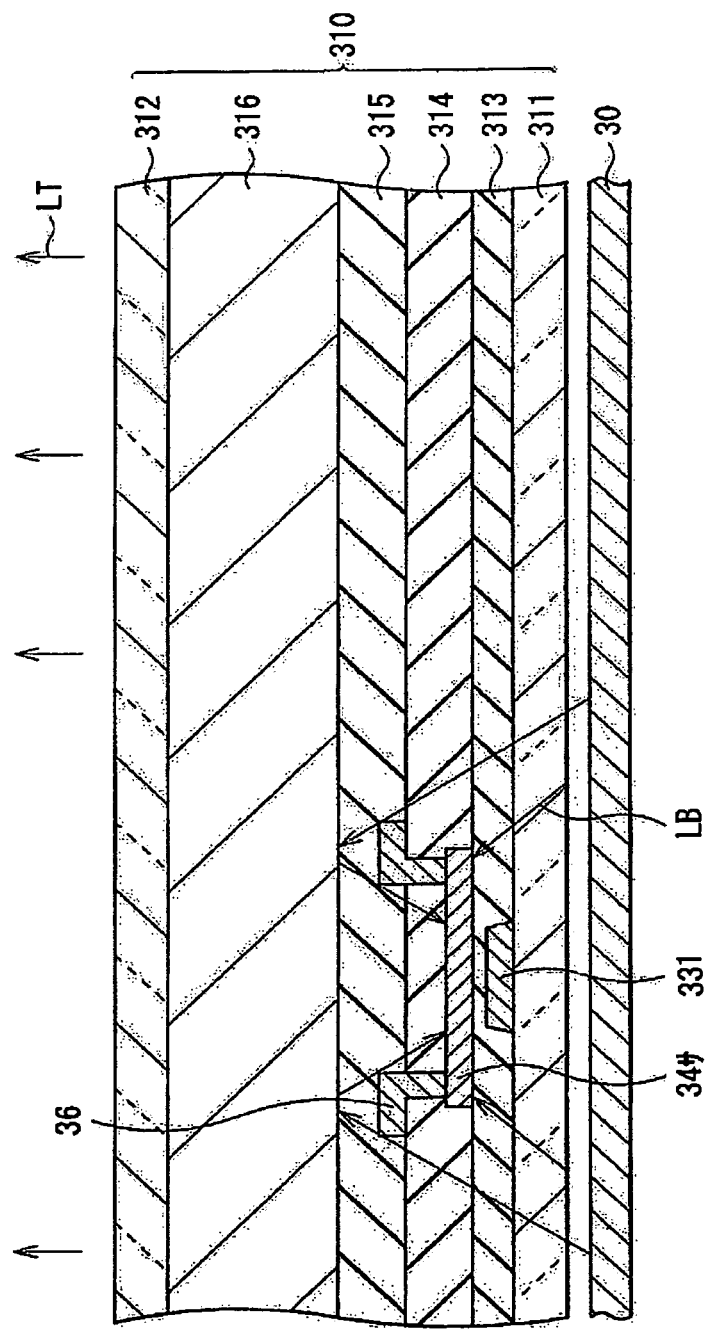
FIG. 3 is a sectional view of a more specific configuration of a part around a main sensor of an input/output panel illustrated in FIG. 2.

1. First Embodiment (Example in the case where a sensitivity correction process and an in-plane correction process are performed)
2. Second Embodiment (Example in the case where a temperature correction process is further performed; in the case where a sensitivity monitor sensor is also used as a temperature sensor)
   Modifications of Second Embodiment
   (Modification 1; in the case where a temperature sensor is separately arranged)
   (Modification 2; a temperature correction process considering temperature dependence of a polarization plate)
3. Common Modifications of First and Second Embodiments (Modifications 3 to 5)
4. Application Examples to electronic devices
   1. First Embodiment Whole Configuration Example of Information Input/Output Device FIG. 1 illustrates a schematic configuration of an information input/output device 1 according to a first embodiment of the invention. FIG. 2 illustrates a specific configuration of the information input/output device 1 according to the embodiment. FIG. 3 illustrates an enlarged sectional view of a part of an input/output panel.

As illustrated in FIG. 1, the information input/output device 1 includes a display 10, and an electronic device body 20 using the display 10. The display 10 includes an input/output panel 11, a display signal processing section 12, a light-receiving signal processing section 13 and an image processing section 14, and the electronic device body 20 includes a control section 21.

Input/Output Panel 11

As illustrated in FIG. 2, the input/output panel 11 is configured of a liquid crystal display panel in which a plurality of pixels 16 are arranged in a matrix form, and includes display elements 11a, light-receiving elements 11b and sensitivity monitor sensors 35 (second light-receiving elements).

The display elements 11a are display elements displaying an image such as a graphic or a character on a display surface through the use of light emitted from a backlight as a light source. The light-receiving elements 11b are, for example, light-receiving elements such as photodiodes receiving light to output an electrical signal in response to reception of the light. The light-receiving elements 11b receive reflected light which is emitted from the backlight, and then is reflected back from an external proximity object such as a finger located outside of the input/output panel 11, and then the light-receiving elements 11b output a light-receiving signal in response to reception of the reflected light. In the embodiment, a plurality of the light-receiving elements 11b are arranged in pixels 16, respectively, in a plane.

The sensitivity monitor sensors 35 are light-receiving elements for monitoring the intensity of emitted light (detection light) from the display surface (in this case, the backlight), and are configured of, for example, photodiodes or the like as in the case of the light-receiving elements 11b. For example, as illustrated in FIG. 2, the sensitivity monitor sensors 35 are arranged in a line in each of an upper end region and a lower end region of the input/output panel 11. The configuration of the sensitivity monitor sensor 35 will be described in detail later (refer to FIGS. 4 to 6).

As illustrated in FIG. 2, in the input/output panel 11, a plurality of light-emitting/receiving cells CWR are arranged in a matrix form. Each of the light-emitting/receiving cells WR includes a light-emitting cell CW and a light-receiving cell CR contained in the light-emitting cell CW. The light-emitting cell CW is configured of a liquid crystal cell as the display element 11a, and the light-receiving cell CR includes a main sensor (a first light-receiving element) which will be described later as the light-receiving element 11b. As illustrated in FIG. 3, the input/output panel 11 includes a liquid crystal panel 310 which includes insulating layers 313 to 315 and a liquid crystal layer 316 between a pair of transparent substrates 311 and 312, and a backlight 30. The backlight 30 functions as a light source emitting backlight light LB used for picture display and light for detecting an external proximity object (detection light; for example, invisible light such as infrared light). A light-shielding metal sensor gate 331 is formed in the insulating layer 313 of the liquid crystal panel 310, and the main sensor 34 is formed in the insulating layer 314 around the top of the light-shielding metal sensor gate 331. Moreover, a metal wire 36 connected to the main sensor 34 is formed in the insulating layers 314 and 315. Light from the transparent substrate 312 arranged on a side opposite to the backlight 30 enters into the main sensor 34. Moreover, as illustrated in FIG. 3, in addition to the light, the backlight light LB directly enters into the main sensor 34, or the backlight light LB reflected from an interface in an multilayer film or a reflective layer (not illustrated) in the liquid crystal panel 31, the metal wire 36 or the like indirectly enters into the main sensor 34. In addition, light-shielding bodies 332 which will be described later may be arranged in a region above some of the main sensors 34 so as to obtain a difference between a light-receiving signal by the main sensor 34 above which the light-shielding body 332 is not arranged and a light-receiving signal by the main sensor 34 above which the light-shielding body 332 is arranged. Thereby, influences of direct light and indirect light of the above-described backlight light LB on the light-receiving signals from the main sensors 34 are removable.

Display Signal Processing Section 12

The display signal processing section 12 illustrated in FIG. 1 is a circuit which is connected to a former stage of the input/output panel 11 and drives the input/output panel 11 so as to display an image based on display data.

As illustrated in FIG. 2, the display signal processing section 12 includes a display signal holding control section 40, a light emission side scanner 41, a display signal driver 42 and a light reception side scanner 43.

The display signal holding control section 40 stores and holds display signals outputted from the display signal generation section 44 for each screen (for each field of display) in a field memory configured of, for example, an SRAM (Static Random Access Memory) or the like. The display signal holding control section 40 also has a function of controlling the light emission side scanner 41 and the display signal driver 42 which drive each light emission cell CW, and the light reception side scanner 43 which drives each light reception cell CR to operate in conjunction with one another. More specifically, a light emission timing control signal and a light reception timing control signal are outputted to the light emission side scanner 41 and the light reception side scanner 43, respectively, and display signals for one horizontal line are outputted to the display signal driver 42 based on a control signal and the display signals held in the field memory. A line-sequential operation is performed in response to the control signal and the display signals.

The light emission side scanner 41 has a function of selecting a light emission cell CW to be driven in response to the light emission timing control signal outputted from the display signal holding control section 40. More specifically, a light emission selection signal is supplied through a light emission gate line connected to each pixel 16 of the input/output panel 11 to control a light-emitting element selection switch. In other words, when a voltage for turning on the light-emitting element selection switch of a given pixel 16 is applied in response to the light emission selection signal, the pixel 16 emits light with a luminance corresponding to a voltage supplied from the display signal driver 42.

The display signal driver 42 has a function of supplying display data to a light emission cell CW to be driven in response to display signals for one horizontal line outputted from the display signal holding control section 40. More specifically, a voltage corresponding to display data is supplied to the pixel 16 selected by the above-described light emission side scanner 41 through a data supply line connected to each pixel 16 of the input/output panel 11. When the light emission side scanner 41 and the display signal driver 42 perform line-sequential operations in conjunction with each other, an image corresponding to arbitrary display data is displayed on the input/output panel 11.

The light reception side scanner 43 has a function of selecting a light reception cell CR (a main sensor 34) to be driven and a sensitivity monitor sensor 35 to be driven in response to the light reception timing control signal outputted from the display signal holding control section 40. More specifically, to drive the light reception cell CR, a light reception selection signal is supplied through a light reception gate line connected to each pixel 16 of the input/output panel 11 to control a light-receiving element selection switch. In other words, as in the case of the operation of the above-described light emission side scanner 41, when a voltage for turning on a light-receiving element selection switch of a given pixel 16 is applied in response to the light reception selection signal, a light-receiving signal detected by the main sensor 34 of the pixel 16 is outputted to the light-receiving signal receiver 45. Thereby, for example, light reflected from an object touching or in proximity to the input/output panel 11 from light emitted from a given light emission cell CW is allowed to be received and detected by the light reception cell CR. In addition, the drive of the sensitivity monitor sensor 35 will be described later (refer to FIG. 6). The light reception side scanner 43A also outputs a light reception block control signal to the light-receiving signal receiver 45 and the light-receiving signal holding section 46, and also has a function of controlling a block contributing to these light reception operations. In addition, in the information input/output device 1 according to the first embodiment, the above-described light emission gate line and the above-described light reception gate line are separately connected to each of the light-emitting/receiving cells CWR, and the light emission side scanner 41 and the light reception side scanner 43 are operable independently.

Light-Receiving Signal Processing Section 13

The light-receiving signal processing section 13 illustrated in FIG. 1 is connected to a latter stage of the input/output panel 11, and captures a light-receiving signal (a picked-up image) from the light-receiving element 11b (the main sensor 34) and a sensitivity monitor signal (an intensity monitor signal) from the sensitivity monitor sensor 35. Thereby, in the light-receiving signal processing section 13, signal processing including a predetermined correction process which will be described later is performed. The light-receiving signal processing section 13 includes the light-receiving signal receiver 45 and the light-receiving signal holding section 46 illustrated in FIG. 2, and outputs a processed image (a corrected image) as an image subjected to the above-described signal processing. In addition, the configuration of the light-receiving signal processing section 13 will be described in detail later (refer to FIGS. 7 to 13).

The light-receiving signal receiver 45 has a function of obtaining light-receiving signals for one horizontal line from each light reception cell CR (each main sensor 34) and a sensitivity monitor signal from each sensitivity detection sensor 35 in response to the light reception block control signal outputted from the light reception side scanner 43. The light-receiving signals and the sensitivity monitor signal are outputted to the light-receiving signal receiver 45 through light-receiving signal output lines 340 and 350, respectively. Moreover, the light-receiving signals and the sensitivity monitor signal obtained in the light-receiving signal receiver 45 are outputted to the light-receiving signal holding section 46.

The light-receiving signal holding section 46 reconstructs light-receiving signals for each screen (for each field of display) from the light-receiving signals outputted from the light-receiving signal receiver 45 in response to the light reception block control signal outputted from the light reception side scanner 43. Such reconstructed light-receiving signals are stored and held in a field memory configured of, for example, an SRAM or the like. Data of the light-receiving signals stored in the light-receiving signal holding section 46 is outputted to the image processing section 14. In addition, the light-receiving signal holding section 46 may be configured of a storage element except for a memory, and, for example, the light-receiving signals may be held as analog data (an electric charge) in a capacitive element.

Image Processing Section 14

The image processing section 14 (refer to FIG. 1) is connected to a latter stage of the detection signal processing section 13, and captures a processed image from the light-receiving signal processing section 13 to perform a process such as binarization, noise removal or labeling which will be described later (a position detection section 47 in FIG. 2). Thereby, object information about an external proximity object, that is, information about one or more of the barycenter or central coordinates of the external proximity object and the region (size or shape) of the external proximity object is obtainable. More specifically, in the image processing section 14, signal processing is performed based on label information, position information, area information and the like obtained by a labeling processing section to specify the position or the like where a detected object is located. Thereby, the position of a finger or the like touching or in proximity to the input/output panel 11 is allowed to be specified.

Electronic Device Body 20

The electronic device body 20 (refer to FIG. 1) outputs display data to the display signal processing section 12 of the display 10, and object information from the image processing section 14 is inputted into the electronic device body 20. The control section 21 changes a display image through the use of the object information.

The control section 21 (refer to FIG. 1) changes a display image through the use of the object information, and is configured of, for example, a CPU (Central Processing Unit) or the like. As illustrated in FIG. 2, the control section 21 includes a display signal generation section 44. The display signal generation section 44 is configured of a CPU or the like (not illustrated), and generates a display signal for displaying each screen (each field of display) based on supplied image data to output the display signal to the display signal holding control section 40.

Specific Configuration Example of Sensitivity Monitor Sensor

Figure 4:
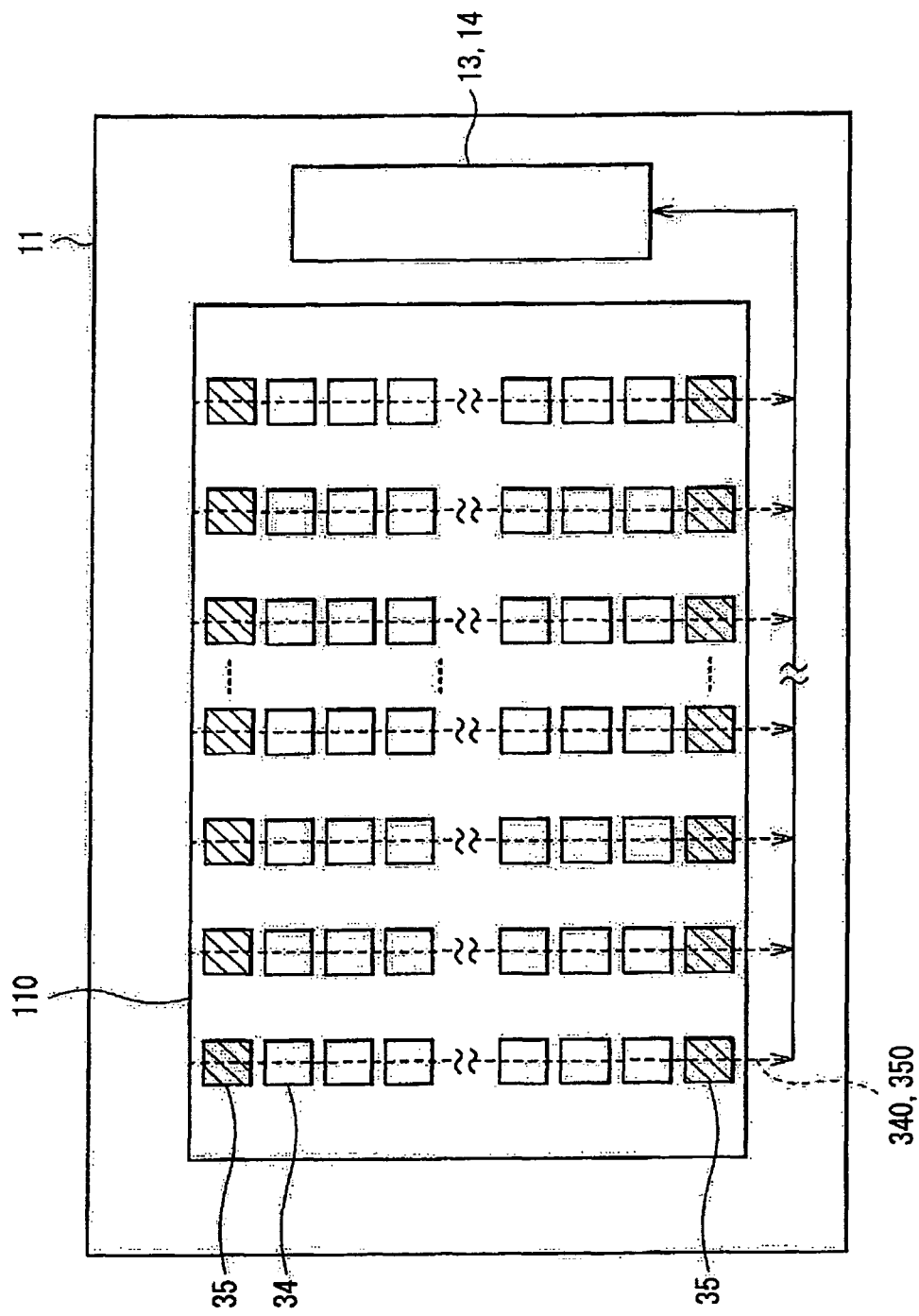
FIG. 4 is a schematic plan view of an arrangement example of the main sensors and sensitivity monitor sensors in the input/output panel illustrated in FIG. 2.
Figure 5:
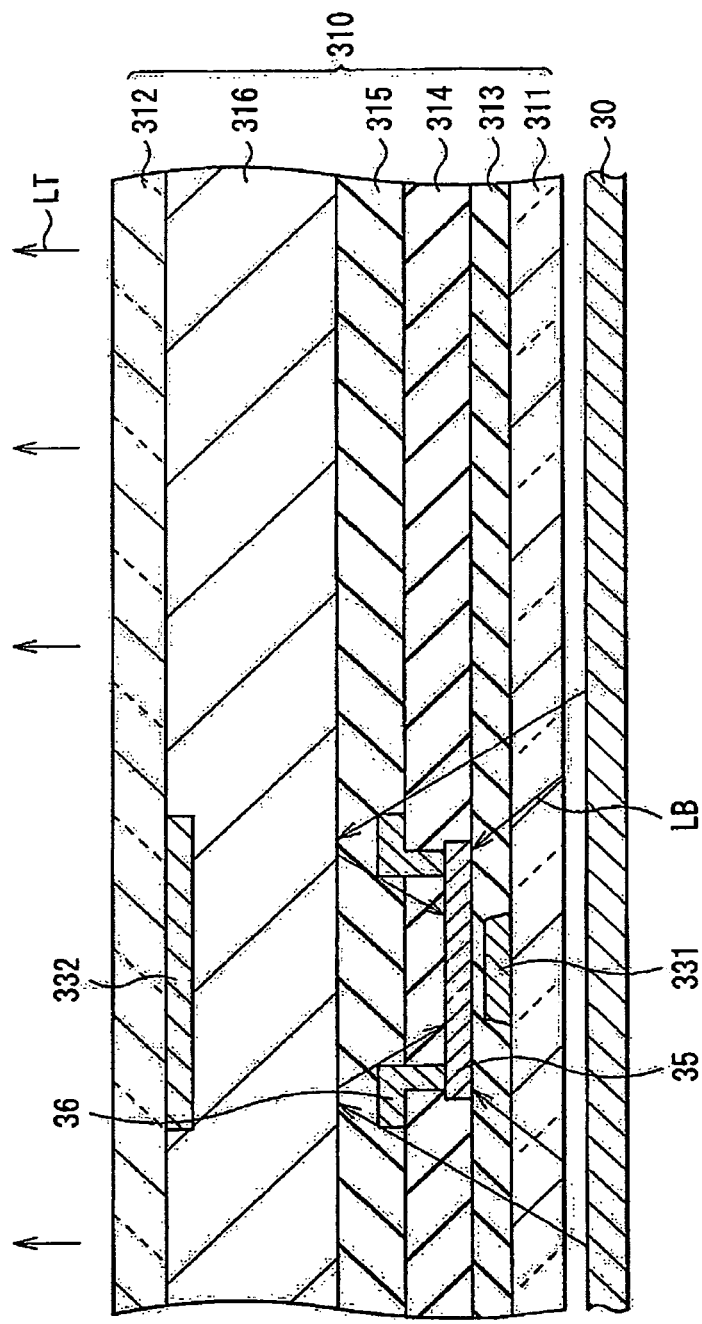
FIG. 5 is a sectional view of a more specific configuration of a part around the sensitivity monitor sensor of the input/output panel illustrated in FIG. 2.
Figure 6:
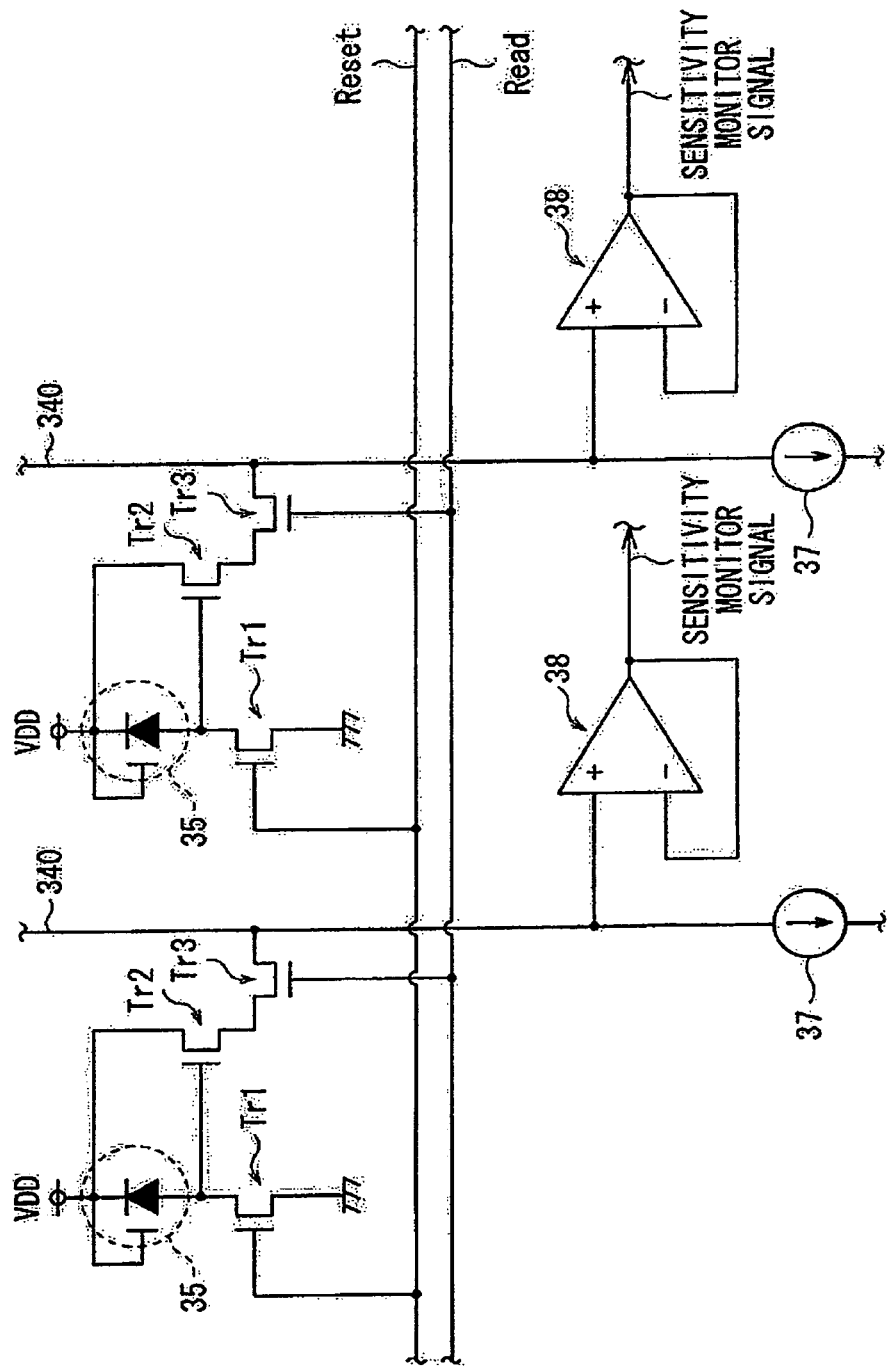
FIG. 6 is a circuit diagram of a configuration example of a light reception circuit including the sensitivity monitor sensors in the input/output panel illustrated in FIG. 2.

Next, referring to FIGS. 4 to 6, a specific configuration of the sensitivity monitor sensor 35 in the embodiment will be described below. FIG. 4 illustrates an arrangement example of the main sensors 34 and the sensitivity monitor sensors 35 in the input/output panel 11. FIG. 5 illustrates a sectional configuration example of a part around the sensitivity monitor sensor 35 of the input/output panel 11. FIG. 6 illustrates a configuration example of a light reception circuit including the sensitivity monitor sensor 35 in the input/output panel 11.

As illustrated in FIGS. 2 and 4, in the input/output panel 11, the main sensors 34 and the sensitivity monitor sensors 35 are arranged in a matrix form in the whole effective display region 110. More specifically, the sensitivity monitor sensors 35 are arranged in one line above and below the main sensors 34 arranged in a matrix form. Then, light-receiving signals and sensitivity monitor signals obtained from the main sensors 34 and the sensitivity monitor sensors 35 are inputted into the light-receiving signal processing section 13 and the image processing section 14 through the light-receiving signal output lines 340 and 350, respectively.

Moreover, as illustrated in FIG. 5, a region around the sensitivity monitor sensor 35 in the liquid crystal panel 310 of the input/output panel 11 has substantially the same sectional configuration as that of a region around the main sensor 34 illustrated in FIG. 3. Thereby, the backlight light LB also directly enters into the sensitivity monitor sensors 35, or the backlight light LB reflected from the interface in the multilayer film or a reflective layer (not illustrated) in the liquid crystal panel 310, the metal wire 36 or the like also indirectly enters into the sensitivity monitor sensors 35. Moreover, incident efficiency of the backlight light LB to the sensitivity monitor sensor 35 is improved. Such a reflective layer may not be arranged. However, the light-shielding body 332 for preventing direct entry of outside light is arranged in a region above the sensitivity monitor sensor 35.

Moreover, as illustrated in FIG. 6, the light reception circuit including the sensitivity monitor sensor 35 includes, in addition to the sensitivity monitor sensor 35 configured of, for example, a photodiode or the like, three transistors Tr1 to Tr3, a constant current source 37 and an amplifier 38. These transistors Tr1 to Tr3 each are configured of, for example, a thin film transistor (TFT) or the like. In the light reception circuit, a cathode of the sensitivity monitor sensor 35 is connected to a power source DVV, and an anode of the sensitivity monitor sensor 35 is connected to a drain of the transistor Tr1 and a gate of the transistor Tr2. Moreover, a source of the transistor Tr1 is connected to a ground, and a gate of the transistor Tr1 is connected to a reset signal line Reset. Further, a source of the transistor Tr2 is connected to the power source VDD, and a drain of the transistor Tr2 is connected to a drain of the transistor Tr3. Moreover, a gate of the transistor Tr3 is connected to a read signal line Read, and a source of the transistor Tr3 is connected to the light-receiving signal output line 340. The constant current source 37 is connected to the light-receiving signal output line 340. Moreover, in the amplifier 38 functioning as a voltage follower, a noninverting input terminal is connected to the light-receiving signal output line 340, and an inverting input terminal and an output terminal are connected to each other, and the sensitivity monitor signal is outputted from the output terminal. In the light reception circuit with such a configuration, the reset signal line Reset is changed to an "H (high)" state, the transistor Tr1 is changed to an ON state, thereby a light reception potential on the anode side according to the light amount of light detection in the sensitivity monitor sensor 35 is reset to the ground. Moreover, when the read signal line Read is changed to the "H" state, the transistors Tr2 and Tr3 functioning as source followers are changed to the ON state according to the light reception potential on the anode side of the sensitivity monitor sensor 35, and the light reception potential is outputted to the light-receiving signal output line 340. Then, the light reception potential is amplified by the amplifier 38, thereby the sensitivity monitor signal is outputted.

Specific Configuration Example of Light-Receiving Signal Processing Section 13

Figure 7:
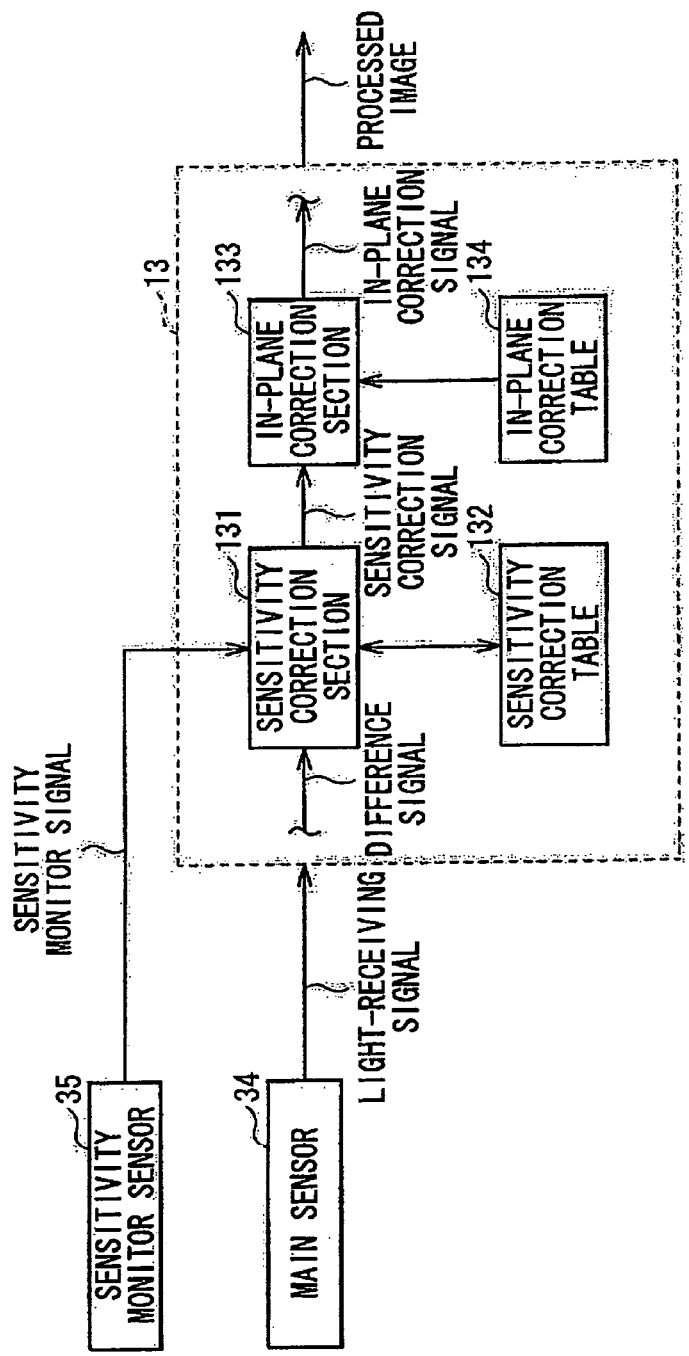
FIG. 7 is a block diagram of a specific configuration of a light-receiving signal processing section illustrated in FIG. 1.

Next, referring to FIG. 7, a specific configuration of the light-receiving signal processing section 13 will be described below. FIG. 7 illustrates a specific block configuration of the light-receiving signal processing section 13.

The light-receiving signal processing section 13 includes a sensitivity correction section 131, a sensitivity correction table 132, an in-plane correction section 133 and an in-plane correction table 134. In addition, the sensitivity correction section 131 and the in-plane correction section 133 correspond to specific examples of "a correction section" in the invention.

The sensitivity correction section 131 performs a sensitivity correction process which will be described later on a difference signal (which will be described later) based on the light-receiving signals from the main sensor 34 through the use of the sensitivity monitor signals from the sensitivity monitor sensors 35 and the sensitivity correction table 132 so as to generate a sensitivity correction signal. More specifically, adaptive sensitivity correction is performed on the light-receiving signals through the use of the sensitivity monitor signals so that light-receiving signals obtained based on the backlight light LB reflected from a single external proximity object have uniform intensities. In addition, such a sensitivity correction process will be described in detail later.

Figures 11, 12:
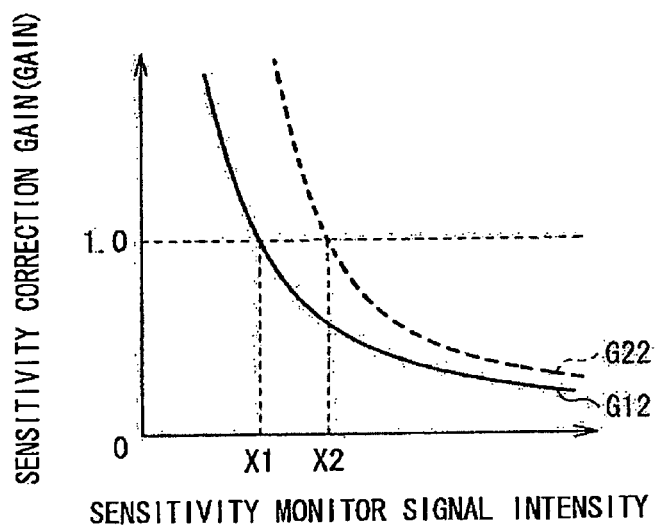
FIG. 11 is a plot of an example of a relationship between sensitivity monitor intensity and sensitivity correction gain when forming the sensitivity correction table.
FIG. 12 is a schematic view of an example of the in-plane correction table.

The sensitivity correction table 132 includes an inversely proportional curve with respect to a proportional straight line as a gradient representing a ratio between the intensity of the sensitivity monitor signal and the intensity of the light-receiving signal in a reference reflecting plate (refer to curves G12 and G22 in FIG. 11). Such a sensitivity correction table 132 is stored in a memory (not illustrated). In addition, the sensitivity correction table 132 will be described in detail later.

The in-plane correction section 133 performs an in-plane correction (in-plane variation correction) process which will be described later on the difference signal (a sensitivity correction signal) subjected to sensitivity correction by the sensitivity correction section 131 through the use of the in-plane correction table 134 so as to generate an in-plane correction signal. In addition, in the image processing section 13, a processed image is formed based on the in-plane correction signal.

The in-plane correction table 134 is formed with the reference reflecting plate which will be described later, and is a correction table for compensating an in-plane luminance distribution of the backlight 30 and a difference in light reception sensitivity among the light-receiving elements 11b (the main sensors 34). Such an in-plane correction table 134 is stored in a memory (not illustrated). In addition, the in-plane correction table 134 will be described in detail later.

Specific Configuration Example of Correction Table

Figure 8:
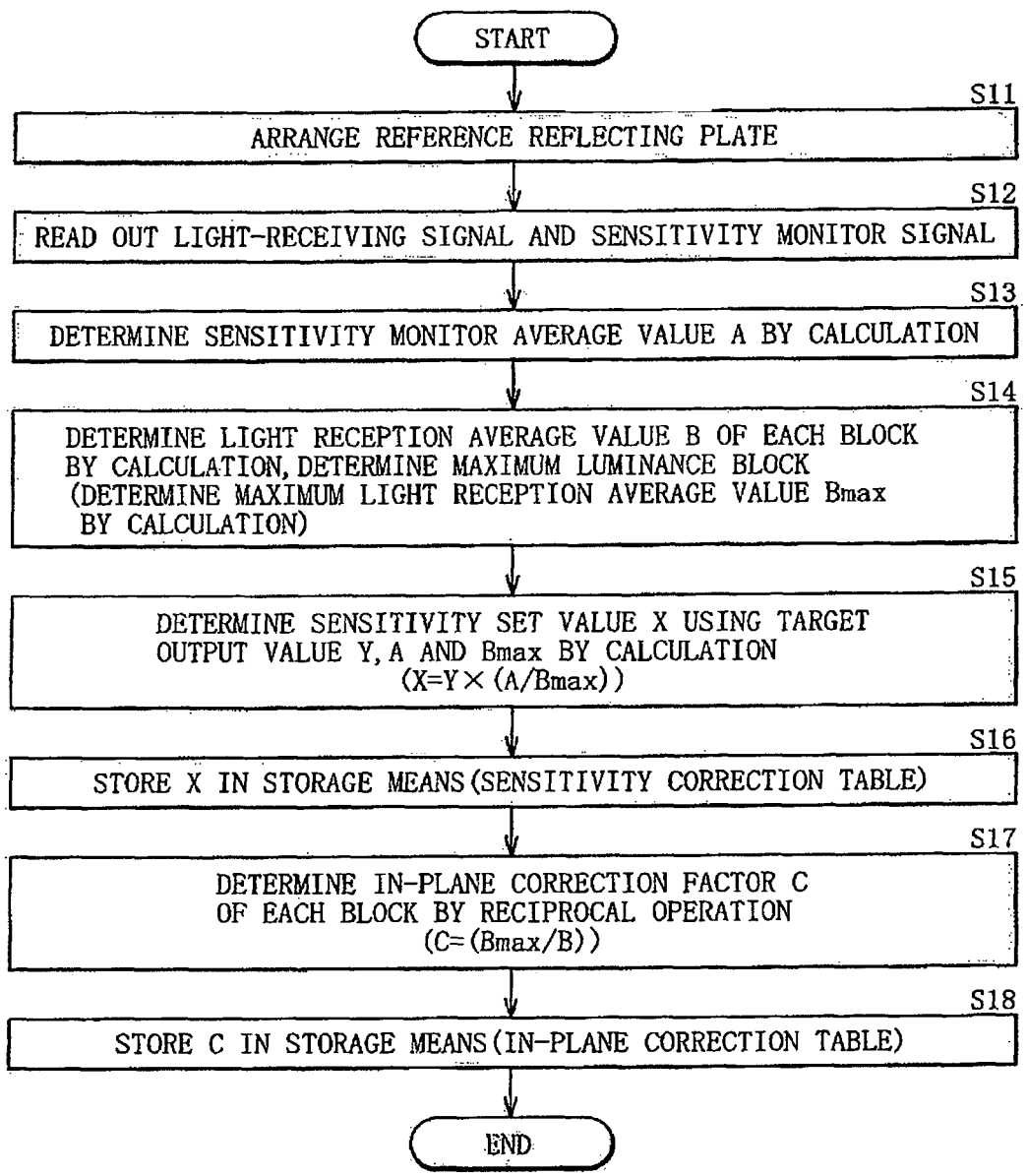
FIG. 8 is a flow chart of an example of a method of forming a sensitivity correction table and an in-plane correction table.
Figure 9:
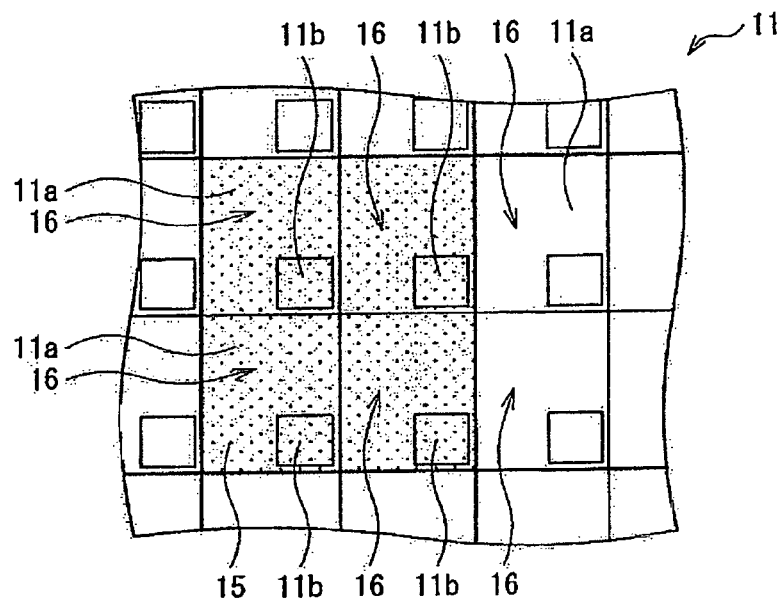
FIG. 9 is a schematic plan view for describing the case where a plurality of light-receiving elements are divided into a plurality of blocks (groups).

Next, referring to FIGS. 8 to 13, specific configurations of the sensitivity correction table 132 and the in-plane correction table 134 will be described below. FIG. 8 illustrates a flow chart of an example of a method of forming the sensitivity correction table 132 and the in-plane correction table 134. In this case, as illustrated in FIG. 9, the case where correction is performed using a block (group) 15 including a plurality of (four) light-receiving elements 11b included in a plurality of (four in this case) light-emitting/receiving cells CWR as one correction unit will be described below.

First, the reference reflecting plate (not illustrated) of which a surface has uniform reflectivity is arranged over the whole surface of the input/output panel 11 so as to face the input/output panel 11 (step S11 in FIG. 8). In this state, all of the light emission cells CW (the liquid crystal cells) as the display elements 11a are changed to a white display state (that is, the highest gray-scale state) by a display signal from the display signal processing section 12, thereby substantially all of emitted light from the backlight is emitted from a display surface. The emitted light from the display surface is reflected from the reference reflecting plate, and the reflected light is received by the main sensor 34 in each of the light-receiving elements 11b and the sensitivity monitor sensors 35. In this case, all color light emission cells of R, G and B in the light emission cells CW may be changed to the highest gray-scale state to display literally white (displaying strictly white). Alternatively, only light emission cells of a specific one color (for example, the color R) may be changed to the highest gray-scale state (displaying broadly white), and light emission cells of other two colors (for example, the colors G and B) may be changed to the lowest gray-scale state (displaying broadly black). In addition, the liquid crystal cells allow infrared light to pass therethrough irrespective of their liquid crystal states (switching states). Therefore, when an infrared light selection pass filter (not illustrated) is arranged on each of the main sensors 34 and the sensitivity monitor sensors 35, even if the liquid crystal cells are in a black display state, the above-described light reflection and light reception is allowed through the use of infrared light included in the backlight 30.

Next, the light-receiving signal outputted from the main sensor 34 in each of the light-receiving elements 11b and the sensitivity monitor signal outputted from the sensitivity monitor sensor 35 are read out (step S12). In this case, the light-receiving element 11b used in the embodiment is arranged for each of pixels 16. Therefore, to reduce the capacity of the memory storing the in-plane correction table 134, one block 15 including a plurality of light-receiving elements 11b arranged adjacent to one another as described above is formed, and a correction factor for in-plane correction of each block 15 is determined. As an example, as illustrated in FIG. 9, among the pixels 16 arranged in a column direction and a row direction, 2×2=4 pixels 16 adjacent to one another in the column direction and the row direction form one block 15. Thereby, the light-receiving elements 11b arranged in a plurality of pixels 16, respectively, are divided into a plurality of blocks 15, and each block 15 forms a light-receiving element group. In addition, any number (for example, 3×3, 2×4, 4×4 or the like) of light-receiving elements 11b other than 2×2 light-receiving elements 11b (pixels 16) illustrated in FIG. 9 may form such a block 15.

Next, a sensitivity monitor average value A as an average value of magnitudes (signal intensities) of the sensitivity monitor signals outputted from the sensitivity monitor sensors 35 is determined by calculation (step S13). More specifically, first, for example, sensitivity monitor signals are obtained in order from a plurality of sensitivity monitor sensors 35 arranged on an upper side and a lower side illustrated in FIGS. 2 and 4. Next, only sensitivity monitor signals with an intensity falling within a predetermined range (a range considered as a normal intensity) are adopted from the obtained sensitivity monitor signals, and other sensitivity monitor signals (signals which is considered to contain an error from the sensitivity monitor sensors 35) are removed. Then, the average value of the adopted sensitivity monitor signals is determined as the above-described sensitivity monitor average value A. Thereby, the sensitivity monitor average value A is allowed to be determined without the sensitivity monitor signals with an abnormal value, so a more accurate average value is allowed to be determined.

Next, a light reception average value B as the average value of magnitudes (signal intensities) of light-receiving signals outputted from the light-receiving elements 11b forming each block 15 is determined by calculation. In other words, the average value of light reception intensity of reflected light in each block 15 is determined as the light reception average value B. Moreover, a maximum value among the obtained light reception average values B of a plurality of blocks 15 is a maximum light reception average value Bmax. In other words, a maximum luminance block is determined (step S14).

Figure 10:
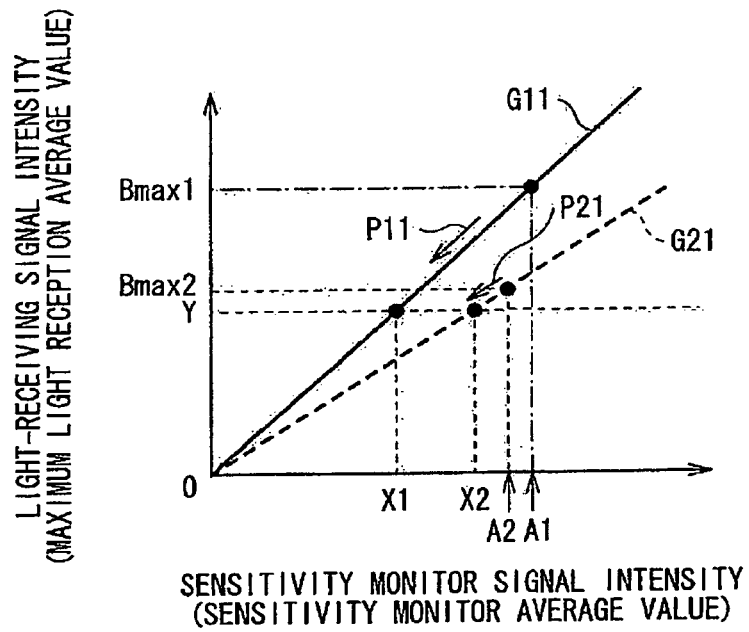
FIG. 10 is a plot of an example of a relationship between sensitivity monitor signal intensity and light-receiving signal intensity when forming the sensitivity correction table.

Next, for example, as illustrated in FIG. 10, a target output value Y (a target value), the sensitivity monitor average value A and the maximum light reception average value Bmax are used to determine a sensitivity set value X in the sensitivity correction process by calculation (step S15). Herein, the target output value Y is a target value of a light-receiving signal intensity set in the reference reflecting plate. More specifically, the sensitivity set value X is determined by the following formula (1). It is because as illustrated in proportional straight lines G11 and G21 in FIG. 10, in individual input/output panels 11, a ratio between the sensitivity monitor signal intensity and the light-receiving signal intensity is basically uniform (basically in a proportional relationship). In other words, as indicated by the proportional straight lines G11 and G21, the gradient of the straight line differs between different input/output panels 11 according to individual variations or the like, but the sensitivity monitor signal intensity and the light-receiving signal intensity basically have a proportional relationship. In this case, in the input/output panel 11 corresponding to the proportional straight line G11, according to such individual variations or the like, when the reference reflecting plate is used, a sensitivity monitor average value A1 and a maximum light reception average value Bmax1 are obtained. On the other hand, in the input/output panel 11 corresponding to the proportional straight line G21, when the reference reflecting plate is used, a sensitivity monitor average value A2 and a maximum light reception average value Bmax2 are obtained. In the embodiment, although details will be given later, as indicated by arrows P11 and P21 in the drawing, while the ratio between the sensitivity signal intensity and the light-receiving signal intensity is maintained, sensitivity correction is performed so that the light-receiving signal intensity reaches the target output value Y in the reference reflecting plate.

$$X = Y \times (A/B\text{max}) \quad (1)$$

More specifically, for example, the sensitivity correction table 132 illustrated in FIG. 11 is obtained by the sensitivity set value X determined in such a manner. In other words, the sensitivity correction table 132 is associated with the sensitivity monitor signal intensity X (X1, X2 or the like in FIG. 10) corresponding to the target output value Y in the reference reflecting plate and a sensitivity correction gain GAIN in sensitivity correction. Moreover, curves G12 and G22 in the sensitivity correction gain GAIN are, for example, inversely proportional curves with respect to the proportional straight lines G11 and G21 in FIG. 10, respectively. Then, sensitivity correction is performed by multiplying the sensitivity correction gain GAIN corresponding to such a sensitivity monitor signal intensity by a light-receiving signal (a difference signal).

Next, the sensitivity correction table 132 is obtained by the sensitivity set value X as the correction factor determined in such a manner, and then is stored in the above-described memory (a storage means) (step S16).

Next, a reciprocal operation determining a reciprocal of a normalized value obtained by dividing the light reception average value B of each block 15 obtained in the step S14 by the maximum light reception average value Bmax is performed, and the result of the operation is considered as an in-plane correction factor C. In other words, the reciprocal operation represented by the following formula (2) is performed to determine the in-plane correction factor C as a correction factor in the in-plane correction process (step S17).

$$C=(B\text{max}/B) \qquad (2)$$

In this case, the above-described normalized value is inevitably a value of 1.0 or less, so the in-plane correction factor C as the reciprocal of the normalized value is inevitably a value of 1.0 or over. Therefore, compared to the case where the in-plane correction factor C is 1.0 or less, a smaller capacity of the memory is necessary for storage. In addition, it is considered that the case where variations in a display surface in-plane luminance distribution in the backlight 30 or variations in the light reception sensitivity among the light-receiving elements 11b are extremely large does not occur frequently, so the light reception average value B of each block 15 is approximately a slightly lower value than the maximum light reception average value Bmax, and consequently the value of the in-plane correction factor C as the result of the reciprocal operation falls in a relatively narrow range of approximately slightly larger than 1.0. Therefore, also in this point, as will be described later, a small capacity of the memory is necessary for storage.

Thus, when the reciprocal operation in the step S17 is performed on each block 15 to determine the in-plane correction factors C in all of the blocks 15, thereby, for example, the in-plane correction table 134 as illustrated in FIG. 12 is obtained, and the in-plane correction table 134 is stored in the above-described memory (step S18).

Figure 13:
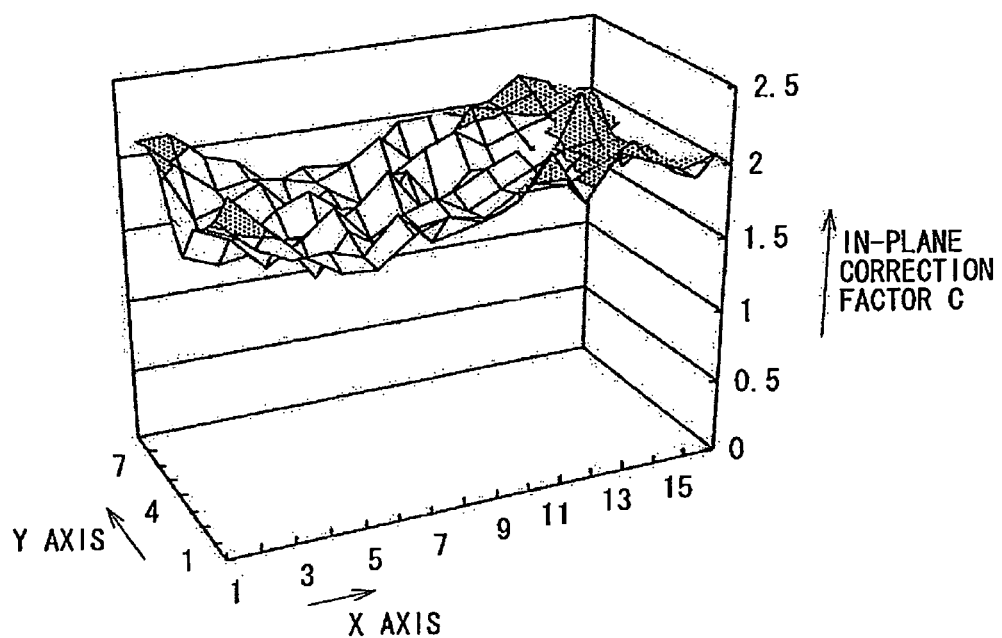
FIG. 13 is a stereoscopic view of an example of the in-plane correction table.

In this case, the in-plane correction table 134 illustrated in FIG. 12 is formed in the case where in a row direction and a column direction of the display surface, that is, an x-axis direction and a y-axis direction, x=1, 2, 3, . . . , N groups in the x-axis direction and y=1, 2, 3, . . . , M groups in the y-axis direction are formed. Then, the in-plane correction factors $C_{11}, C_{21}, \ldots, C_{NM}$ of the groups are determined. The in-plane correction table 134 exemplified with a three-dimensional graph is as illustrated in FIG. 13. In a schematic graph in FIG. 13, a bottom surface corresponds to the display surface of the input/output panel 11, and a height direction indicates the in-plane correction factor C. Thus, in the embodiment, each of the light-receiving elements 11b does not have the in-plane correction factor C, and a plurality of light-receiving elements 11b are divided into groups to form the blocks 15, and each of the blocks 15 has the in-plane correction factor C, so the number of the in-plane correction factors C is allowed to be reduced, and a small memory capacity is necessary for storage.

Functions and Effects of Information Input/Output Device

Figure 14:
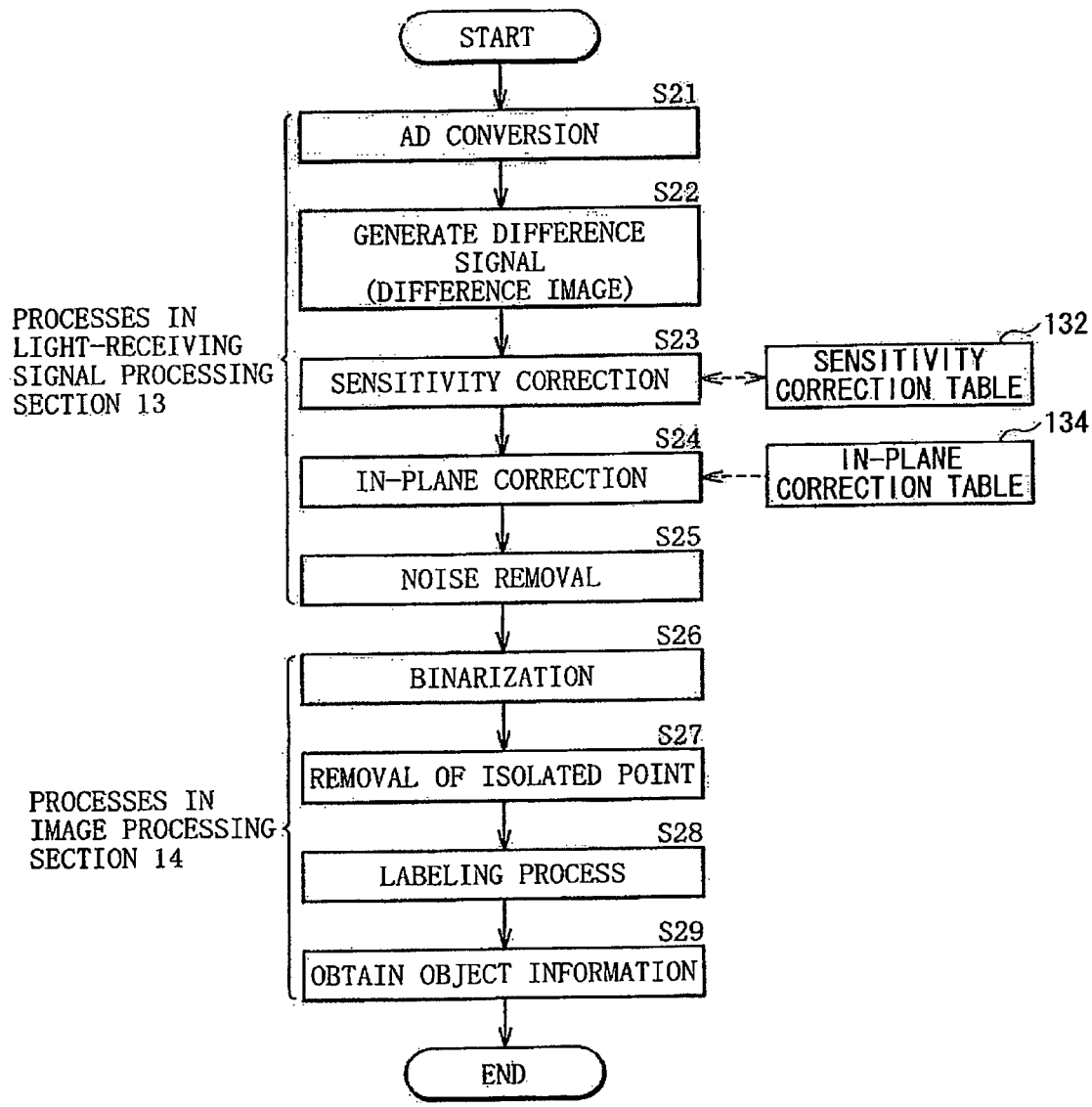
FIG. 14 is a flow chart of an example of a process of obtaining object information according to the first embodiment.

Next, functions and effects of the information input/output device 1 according to the embodiment will be described below. FIG. 14 illustrates a flow chart of a process of obtaining object information in the information input/output device 1.

Obtain Light-Receiving Signal and Sensitivity Monitor Signal

First, display data outputted from the electronic device body 20 is inputted into the display signal processing section 12. The display signal processing section 12 drives the input/output panel 11 so as to display an image thereon according to the display data.

In the input/output panel 11, while light (backlight light LB) emitted from the backlight 30 is used to display an image on the display elements 11a, the light-receiving elements 11b are driven. Then, when an external proximity object such as a finger touches or comes close to the display elements 11a, an image displayed on the display elements 11a is reflected from the external proximity object, and reflected light is detected by the main sensors 34 in the light-receiving elements 11b. By the detection, the light-receiving signals are outputted from the main sensors 34 in the light-receiving elements 11b.

Moreover, at this time, the backlight light LB is monitored by the sensitivity monitor sensors 35, thereby the sensitivity monitor signals are outputted.

Next, the light-receiving signal processing section 13 performs AD conversion on the light-receiving signals and the sensitivity monitor signals to obtain digital signals of them (step S21 in FIG. 14).

Form a Difference Image

Then, the light-receiving signal processing section 13 generates a difference signal (a difference image) which will be described below according to the light-receiving signals (step S22). The difference image means a difference image (a difference image C which will be described later) between an on image Bon and an off image Aoff which will be described later.

Figure 15:
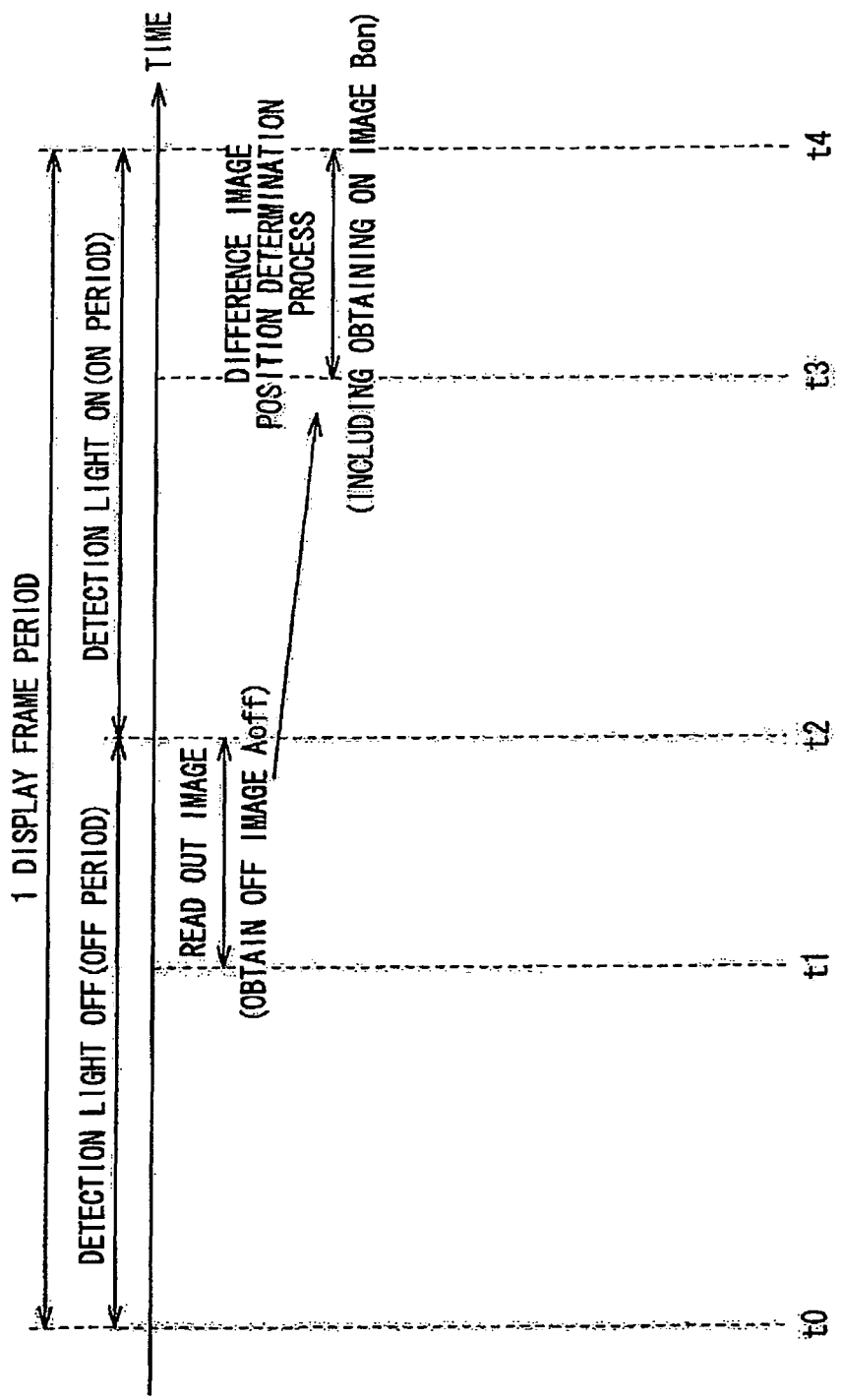
FIG. 15 is a timing chart for describing generation of a difference signal illustrated in FIG. 14.
Figure 18C:
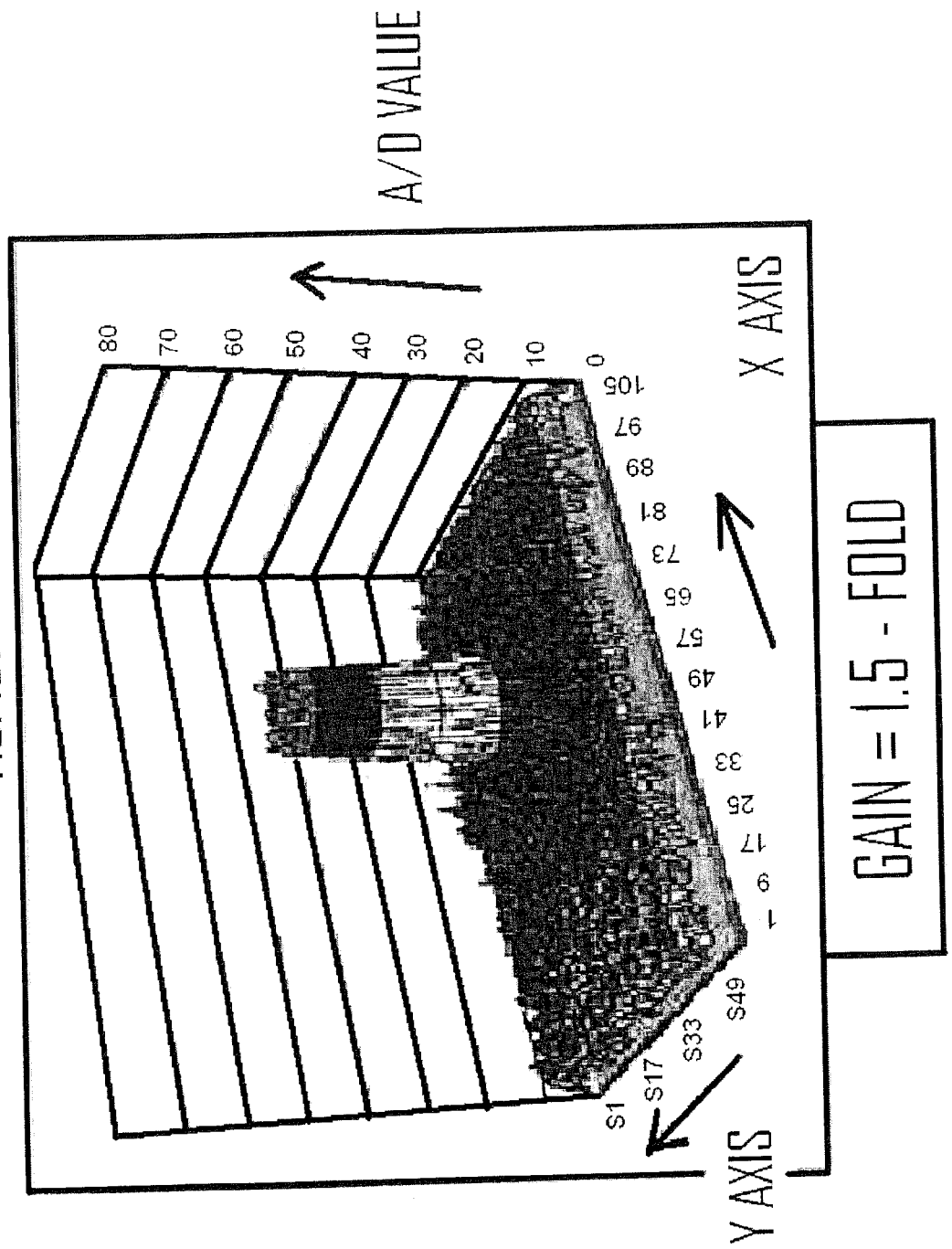

FIG. 15 illustrates a timing chart of a part of a process of obtaining object information (a difference image position determination process) including a process of forming such a difference image C.

First, in such a difference image position determination process, a first half period of one display frame period is a period in which detection light (for example, infrared light) in the backlight 30 is not emitted (an off period) (a period of timings t0 to t2 in FIG. 15). On the other hand, a second half period of the one display frame period is a period in which the detection light in the backlight 30 is emitted (an on period (a period of timings t2 to t4).

In this case, first, in the off period as the first half period of the one display frame period, outside light is received by the main sensors 34 in the input/output panel 11. Thereby, in the light-receiving signal processing section 13, an off image Aoff (a shadow image) as a picked-up image of the external proximity object in the off period is obtained (in a period of the timings t1 to t2).

Next, in the on period as the second half period of the one display frame period, reflected light from the external proximity object and outside light are received by the main sensors 34 in the input/output panel 11. Thereby, in the light-receiving signal processing section 13, an on image Bon (a reflected light-using image) as a picked-up image of the external proximity object in the on period is obtained (in a period of the timings t3 to t4).

Then, the light-receiving signal processing section 13 forms the difference image C between the on image Bon and the off image Aoff (in a period of the timings t3 to t4). In such a difference image C, the influence of brightness of the outside light is removed, so the object is detected without the influence of the brightness of the outside light. Moreover, in addition to such removal of the outside light, fixed noises caused by variations in characteristics among the main sensors 34 or the sensitivity monitor sensors 35 are also removable.

More specifically, as illustrated in a sectional view in FIG. 16A, in the case where incident outside light L0 is bright, a light reception output voltage Von1 in the on period is as illustrated in FIG. 16B. In other words, while the light reception output voltage Von1 has a voltage value Va corresponding to the brightness of the outside light L0 at any point other than a point touched by the external proximity object (finger) f, at a point touched by the finger f, the light reception output voltage Von1 is reduced to a voltage Vb corresponding to reflectivity of the surface reflecting light from the backlight 30 of the finger f touching the point at this time. On the other hand, while a light reception output voltage Voff1 in the off period has the voltage value Va corresponding to the brightness of the outside light L0 at any point other than a point touched by the finger f as in the case of the light reception output voltage Von1, the outside light L0 is blocked at the point touched by the finger f, so the light reception output voltage Voff1 has a extremely low voltage value Vc.

Moreover, as illustrated in a sectional view in FIG. 17A, in a state in which incident outside light L0 is weak (or very little), a light reception output voltage Von2 in the on period is as illustrated in FIG. 17B. In other words, while the light reception output voltage Von2 has a very low voltage value Vc at any point other than a point touched by the finger f because of very little outside light L0, at the point touched by the finger f, the light reception output voltage Von2 is increased to a voltage value Vb corresponding to reflectivity of the surface reflecting light from the backlight 30 of the finger f touching the point at this time. On the other hand, a light reception output voltage Voff2 in the off period still has the extremely low voltage value Vc at both of the point touched by the finger f and any other point, and is not changed.

Thus, it is obvious from a comparison between FIGS. 16A and 16B and FIGS. 17A and 17B that at a point not touched by the finger f, the light reception output voltage largely differs between the case where the outside light L0 is present and the case where the outside light L0 is absent. However, at the point touched by the finger f, irrespective of the presence or absence of the outside light L0, the voltage Vb in the on period and the voltage Vc in the off period are in substantially the same state.

Sensitivity Correction Process

Next, the sensitivity correction section 131 in the light-receiving signal processing section 13 performs a sensitivity correction process on the difference signal generated in such a manner through the use of the sensitivity monitor signal from the sensitivity monitor sensor 35 and the sensitivity correction table 132 to generate a sensitivity correction signal (step S23). More specifically, as illustrated in FIGS. 10 and 11, adaptive sensitivity correction is performed on the light-receiving signals obtained based on the backlight light LB reflected from a single external proximity object so that the light-receiving signals have uniform intensities (the target output value Y). More specifically, as indicated by arrows P11 and P12 in FIG. 10, while maintaining the ratio between the sensitivity monitor signal intensity and the light-receiving signal intensity, sensitivity correction is performed so that the light-receiving signal intensity has the target output value Y in the reference reflecting plate. In other words, as illustrated in FIG. 11, sensitivity correction is performed by multiplying the sensitivity correction gain GAIN corresponding to the sensitivity monitor signal intensity by the light-receiving signal (the difference signal). Thereby, adaptive feedback according to the sensitivity monitor signal is allowed. Therefore, even if a change in light reception sensitivity due to time-dependent degradation in members of the input/output panel 11 or the main sensors 34, or individual variations in light reception sensitivity among the main sensors 34 occur, light-receiving signals with a uniform intensity are obtained from a single external proximity object.

Figure 19:
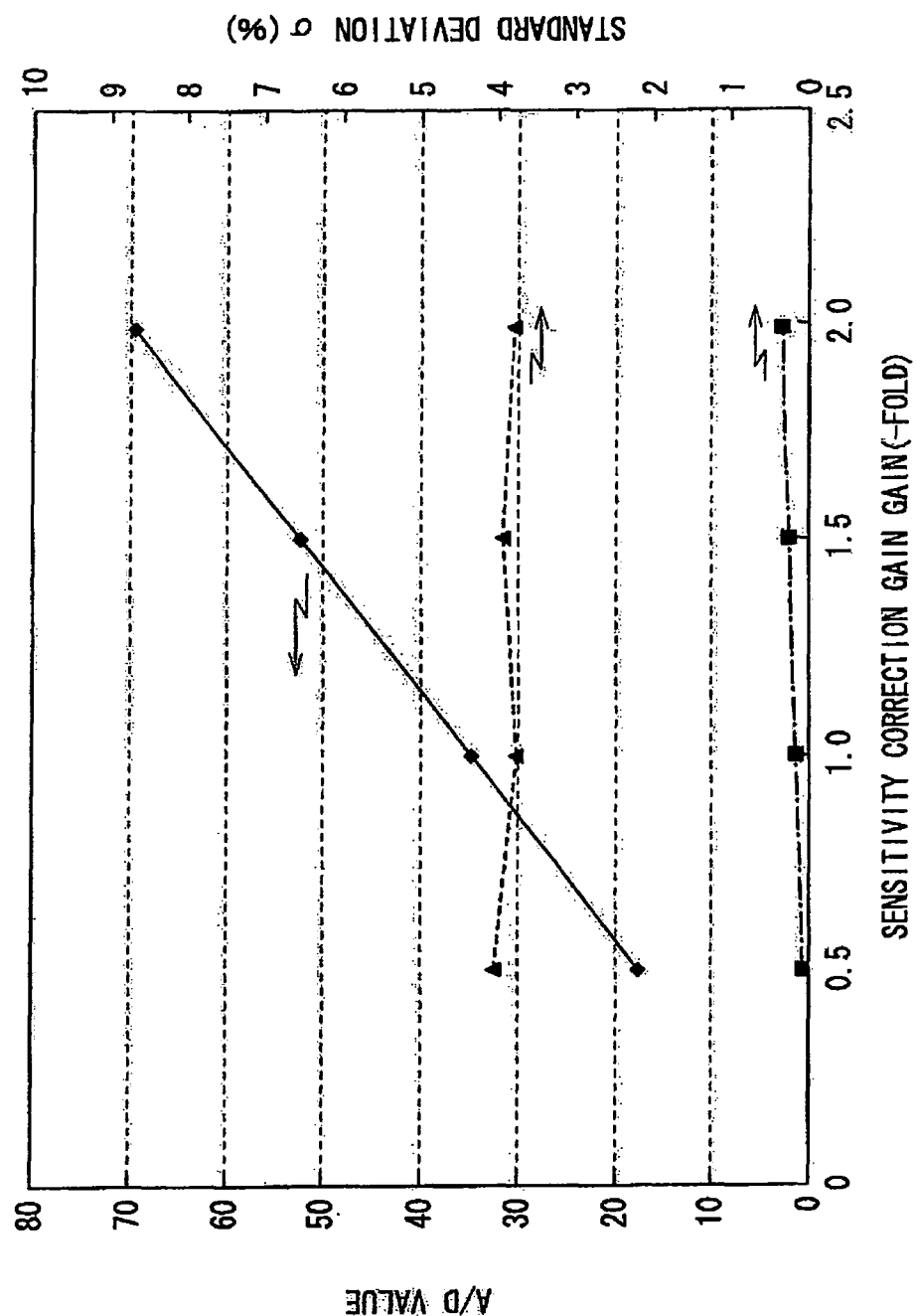
FIG. 19 is a plot illustrating an example of a relationship between the sensitivity correction gain in the signal intensity distributions illustrated in FIGS. 18A to 18D, A/D value and standard deviation.

In this case, FIGS. 18A, 18B, 18C and 18D illustrate an example of a display surface in-plane distribution of the difference signal in the case where the set value of the sensitivity correction gain GAIN by which the difference signal is multiplied is 0.5-fold, 1-fold, 1.5-fold and 1.99-fold, respectively. In these drawings, in the display surface, an x axis and a y axis are set, and a vertical axis indicates an A/D value. Moreover, FIG. 19 illustrates a relationship between the set value of the sensitivity correction gain GAIN, the A/D value and a standard deviation σ based on the results of FIGS. 18A to 18D. It is obvious from FIGS. 18A to 18D and FIG. 19 that when the set value of the sensitivity correction gain GAIN is changed, the intensity (the A/D value) of the difference signal is actually allowed to be changed in a linear function manner.

In-Plane Correction (in-Plane Variation Correction) Process

Next, the in-plane correction section 133 in the light-receiving signal processing section 13 performs an in-plane correction (in-plane variation correction) process on the difference signal (the sensitivity correction signal) subjected to sensitivity correction by the sensitivity correction section 131 through the use of the in-plane correction table 134 so as to generate an in-plane correction signal (step S24).

Figure 20:
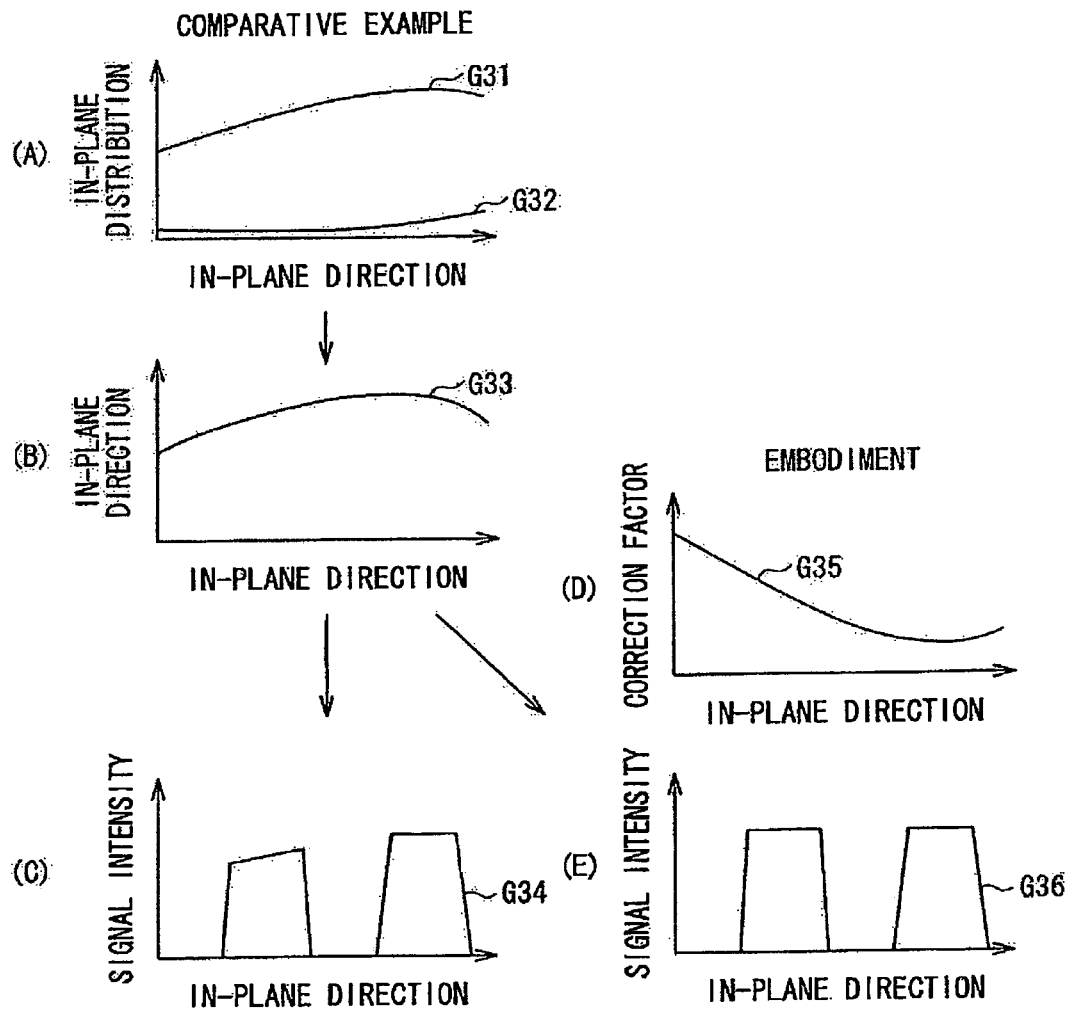
FIG. 20 is an illustration for describing an example of an in-plane correction process illustrated in FIG. 14.

In this case, FIG. 20 illustrates an example of the light-receiving signal, the in-plane correction table 134 and the in-plane correction signal. FIG. 20(A) illustrates an example of a nonuniform state in a plane, and a vertical axis indicates the magnitude of nonuniformity, and a horizontal axis indicates an in-plane direction. FIG. 20(B) illustrates an example of a distribution (a curve G33) formed by combining a display surface in-plane intensity distribution (a curve G31) of light emitted from the display surface and an in-plane light reception sensitivity distribution (a curve G32) of a plurality of light-receiving elements 11b, and a vertical axis indicates the magnitude of nonuniformity, and the horizontal axis indicates an in-plane direction. FIG. 20(C) illustrates an example of the light-receiving signal outputted from the main sensor 34 in the light-receiving element 11b in the case where the combined distribution represented by the curve G33 is present, and the vertical axis indicates the magnitude of nonuniformity, and the horizontal axis indicates an in-plane direction. FIG. 20(D) illustrates an example of the in-plane correction table 134 compensating the combined distribution represented by the curve G33, and the vertical axis indicates the in-plane correction factor C, and the horizontal axis indicate an in-plane direction. FIG. 20(E) illustrates an example of a signal intensity subjected to in-plane correction obtained by multiplying a signal intensity outputted from the main sensor 34 in the light-receiving element 11b by the in-plane correction table 134 represented by a curve G35, and the vertical axis indicates the signal intensity, and the horizontal axis indicate an in-plane direction.

First, a nonuniform luminance state in a surface of the backlight 30 is, for example, as indicated by the curve G31 in FIG. 20(A), and a nonuniform light reception sensitivity state in surfaces of the light-receiving elements 11b arranged in a matrix form is, for example, as illustrated by the curve G32 in FIG. 20(A). Such a combined distribution of the curve G1 and the curve G32 is, for example, as indicated by a curve G33 in FIG. 20(B). Thereby, the signal intensity of a light-receiving signal G34 outputted from the main sensor 34 in the light-receiving element 11b differs in a plane depending on a nonuniform state in the plane indicated by the curve G33 (the curve G31 and the curve G32).

Therefore, in the in-plane correction section 133, an operation (an multiplication) of an inputted light-receiving signal and the in-plane correction table 134 illustrated in FIG. 20(D) is performed so as to uniformly perform in-plane correction on the intensity of the light-receiving signal G36 in a nonuniform state in the plane represented by the light-receiving signal G34 in FIG. 20(C) as illustrated in FIG. 20(E). Thus, in the in-plane correction section 133, a picked-up image (a processed image) is obtained from the light-receiving signal G36 subjected to the in-plane correction process.

Remove Noises—Obtain Object Information

Next, the light-receiving signal processing section 13 removes noises in the above-described processed image through the use of predetermined noise data (step S25).

Next, the image processing section 14 inputs the picked-up image (the processed image) subjected to the sensitivity correction process and the in-plane correction process, and performs a binarization process on the processed image (step S26). In other words, the image processing section 14 stores a preset threshold value, and performs the binarization process in which the signal intensity of processed image data is set to "0" or "1" depending on whether the signal intensity of the processed image data is smaller than the threshold value, or equal to or larger than the threshold value. Thereby, a part where light reflected from the external proximity object is received is set to "1", and the other part is set to "0".

Next, the image processing section 14 removes an isolated point from the binarized processed image (step S27). In other words, the image processing section 14 performs noise removal by removing a part set to "1" isolated from the external proximity object in the case where the processed image is binarized in the above-described manner.

After that, the image processing section 14 performs a labeling process (S28). In other words, the image processing section 14 performs a labeling process on the part set to "1" in the case where the processed image is binarized in the above-described manner.

Figure 21:
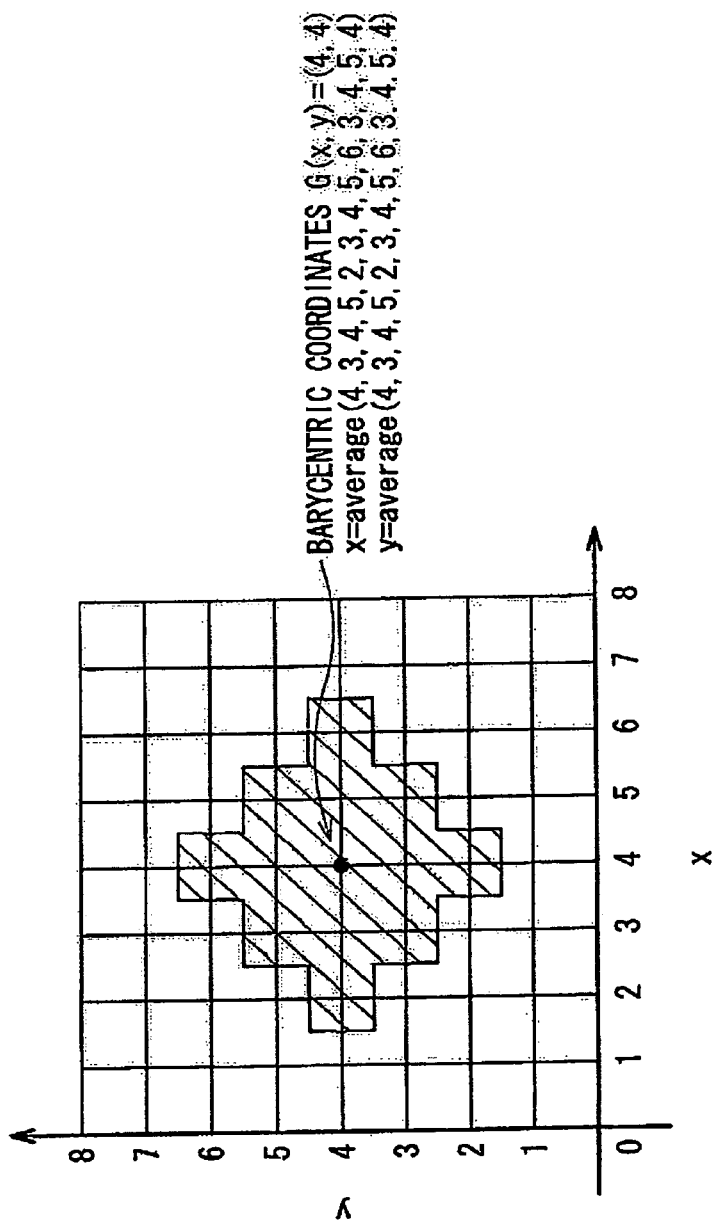
FIG. 21 is a conceptual diagram for describing calculation of barycentric coordinates when obtaining object information.

Then, the image processing section 14 detects a region set to "1" as a region of the external proximity object, and determines the barycenter or the central coordinates of the region to obtain object information (step S29). More specifically, for example, as illustrated in FIG. 21, in an image signal obtained after the labeling process, average values of x and y values of the central coordinates are determined by calculation to determine the barycentric coordinates G of the external proximity object. For example, in the case where an x-coordinate group is (4, 3, 4, 5, 2, 3, 4, 5, 6, 3, 4, 5, 4) and a y-coordinate group is (4, 3, 4, 5, 2, 3, 4, 5, 6, 3, 4, 5, 4), these central coordinates are (x, y)=(4, 4), which are the barycentric coordinates G. Thus, the position of the object is determined. Thereby, the process of obtaining object information illustrated in FIG. 14 is completed, and obtained data such as the position or the like of the external proximity object is outputted to the control section 21 as the object information.

In addition, after that, in the control section 21, a necessary process such as, for example, changing a display image is performed through the use of the object information inputted from the image processing section 14. More specifically, for example, if an operation menu is displayed on a screen, which button in the operation menu is selected by a finger of a user is detected, and a command corresponding to the selected button is executed.

Thus, in the information input/output device 1 according to the embodiment, adaptive sensitivity correction is performed on the light-receiving signals obtained from a single external proximity object through the use of the sensitivity monitor signal so that the light-receiving signals have uniform intensities. In this case, typically, a change in light reception sensitivity caused by time-dependent degradation in the members (such as the liquid crystal panel 310, the backlight 30 and the like) of the input/output panel 11 or the main sensors 34 or individual variations in light reception sensitivity among the main sensors 34 occur. However, even in such a case, light-receiving signals with a uniform intensity are obtained from the single external proximity object by the above-described sensitivity correction.

As described above, in the embodiment, adaptive sensitivity correction is performed on the light-receiving signals obtained from a single external proximity object through the use of the sensitivity monitor signal of the backlight light LB obtained by the sensitivity monitor sensor 35 so that the light-receiving signals have uniform intensities. Thereby, even if a change in the light reception sensitivity due to time-dependent degradation or individual variations in light reception sensitivity occur, the light-receiving signals with a uniform intensity is obtainable from the single external proximity object. Therefore, when the object information about the external proximity object is obtained according to the light-receiving signals subjected to such sensitivity correction, a proximity object such as a finger is detectable with high accuracy.

Moreover, the in-plane luminance distribution of the backlight 30 and the in-plane correction table 13a for compensating a difference in the light reception sensitivity among the light-receiving elements 11b are used to perform in-plane correction on the light-receiving signals from the light-receiving elements receiving light emitted from the backlight 30 and then reflected from the external proximity object. Thereby, more accurate image processing is allowed to be performed based on the corrected light-receiving signals, and as a result, the external proximity object is detectable more accurately.

Further, when the sensitivity correction table 132 or the in-plane correction table 134 is purchased, and then is stored in the memory before delivering the information input/output device 1 to a user, the user is allowed to be saved from having to form these correction tables. However, when these correction tables are also allowed to be formed by the user, even in the case where the input/output panel 11 changes with time, if necessary, a correction table is allowed to be formed according to a time-dependent change in the input/output panel 11. Therefore, even after the input/output panel 11 is used for a long time, a highly accurate picked-up image which is appropriately corrected is obtainable.

In addition, in the above-described embodiment, when the in-plane correction table 134 is formed, the light reception average value B of each block 15 and the maximum light reception average value Bmax are determined, and the in-plane correction factor C is obtained by performing an operation using these values, but the in-plane correction factor C is not limited to a value obtained by the operation. For example, instead of the maximum light reception average value Bmax, an arbitrary constant may be used to determine the in-plane correction factor C. The arbitrary constant may be, for example, 1, and in this case, the in-plane correction factor C is simply a reciprocal of the light reception average value B. Alternatively, instead of the maximum light reception average value Bmax, a value expected to be close to the maximum light reception average value Bmax may be used as the above-described constant. In this case, a result obtained by dividing the constant by each light reception average value B is the in-plane correction factor C. Moreover, the in-plane correction table 134 may be any value as long as the in-plane correction table 134 is a table allowed to compensate (cancel out) the nonuniform state in the plane exemplified by the curves G31 and G32 in FIG. 20(A), that is, a table having an inverted distribution of the curve G33.

Moreover, in the case where the number of the in-plane correction factors C in the in-plane correction table 134 is reduced (roughly set), and the in-plane correction factor C corresponding to a block 15 is not present in the in-plane correction table 134, data interpolation may be performed based on the in-plane correction factor C of an existing block 15. In other words, the in-plane correction factor C of a block 15 including the light-receiving elements 11d which does not have the in-plane correction factor C may be determined by data interpolation, and in-plane correction may be performed using the in-plane correction factor C determined by the interpolation. For example, the in-plane correction factor C of a target block 15 may be interpolated from the in-plane correction factors C of blocks 15 adjacent to the target block 15. Thereby, a large difference between the in-plane correction factors C of blocks 15 adjacent to each other is prevented, and the in-plane correction table 134 is allowed to be changed gradually. Moreover, a necessary memory capacity for the storage of the in-plane correction table 134 is allowed to be reduced.

Further, in the above-described embodiment, one block 15 is configured of a plurality of light-receiving elements 11b adjacent to one another selected from the light-receiving elements 11b arranged in a matrix form, and the in-plane correction factor C of each block 15 is determined to obtain the in-plane correction table 134. However, the in-plane correction factor C of each light-receiving element 11b arranged for each pixel 16 may be determined, and a plurality of the in-plane correction factors C may be combined to obtain the in-plane correction table 134. In this case, compared to the case where the in-plane correction factor C of each block 15 is obtained, minute in-plane correction factors C are obtainable in the plane, so an image subjected to in-plane correction with higher accuracy is obtainable.

2. Second Embodiment

Figure 22:
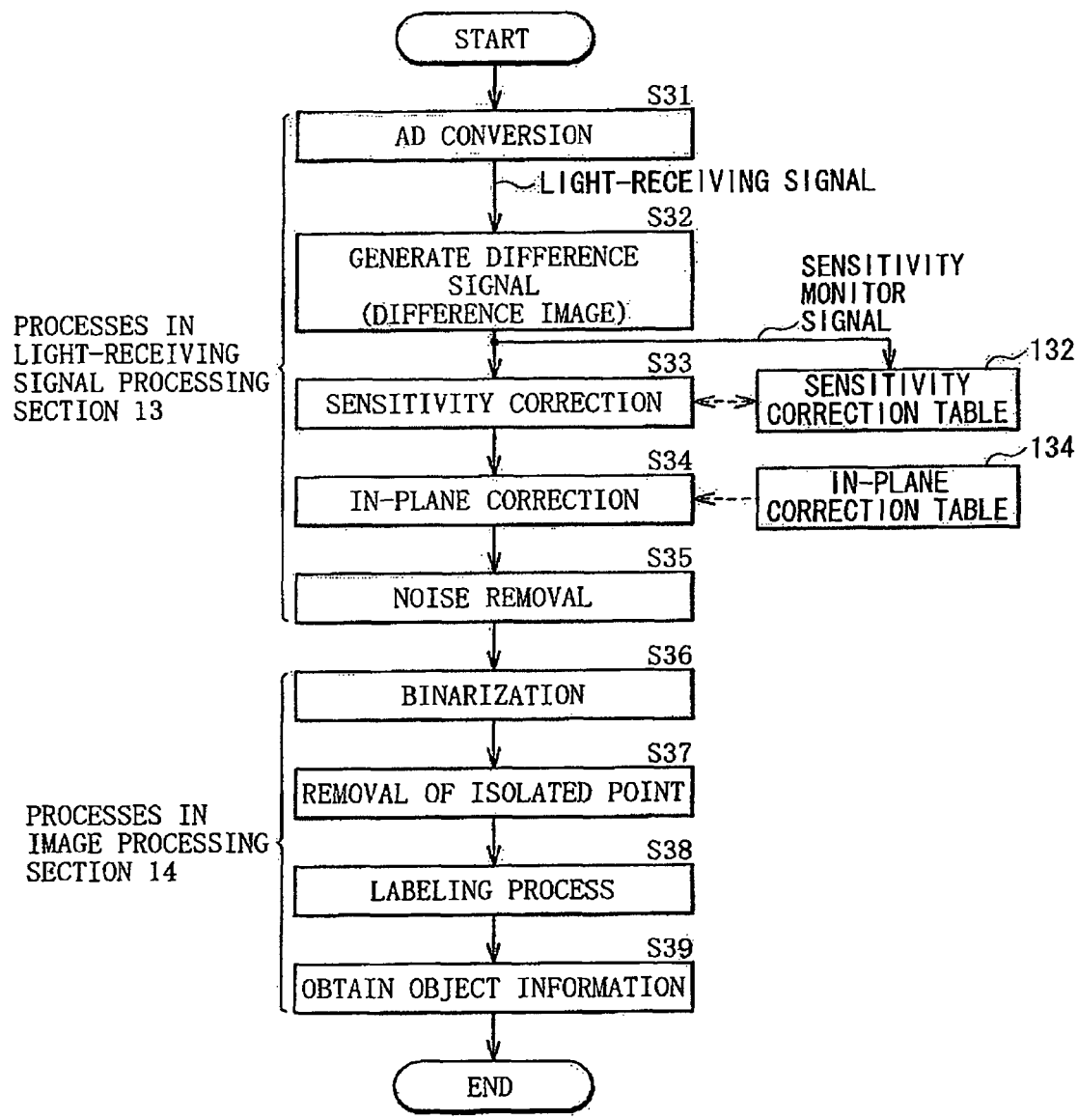
FIG. 22 is a flow chart of an example of a process of obtaining object information according to a second embodiment.

FIG. 22 illustrates a process of obtaining object information in an information input/output device according to a second embodiment of the invention. In addition, like components are denoted by like numerals as of the information input/output device 1 according to the first embodiment and will not be further described. Moreover, among steps S31 to S39 in FIG. 12, processes (the steps S31, S32, and S34 to S39) other than the step S33 are the same as those in the steps S21, S22 and S24 to S29, and will not be further described.

In the embodiment, in a sensitivity correction process corresponding to the step S33, temperature correction is performed on the light-receiving signal in consideration of changes in the intensities of the light-receiving signal and the sensitivity monitor signal caused by temperature fluctuation so as to cancel out these changes in the intensities. More specifically, in the embodiment, the sensitivity monitor sensor 35 also functions as a temperature sensor. In other words, as illustrated in FIG. 22, the sensitivity monitor signal is inputted into a sensitivity correction table 132A, thereby to perform appropriate sensitivity correction according to environmental temperature (to select an appropriate sensitivity correction gain GAIN).

More specifically, first, typically, for example, as illustrated in FIG. 23(A), the intensities of the light-receiving signal and the sensitivity monitor signal are changed according to environmental temperature.

At this time, for example, as illustrated in FIG. 23(B), in some cases, at each temperature, the ratio between the light-receiving signal intensity and the sensitivity monitor signal intensity is uniform (the rate of change at each temperature is uniform). On the other hand, for example, as illustrated in FIG. 23(C), at each temperature, in some cases, the ratio between the light-receiving signal intensity and the sensitivity monitor signal intensity changes (the rates of change at temperatures are different).

Figure 24A:
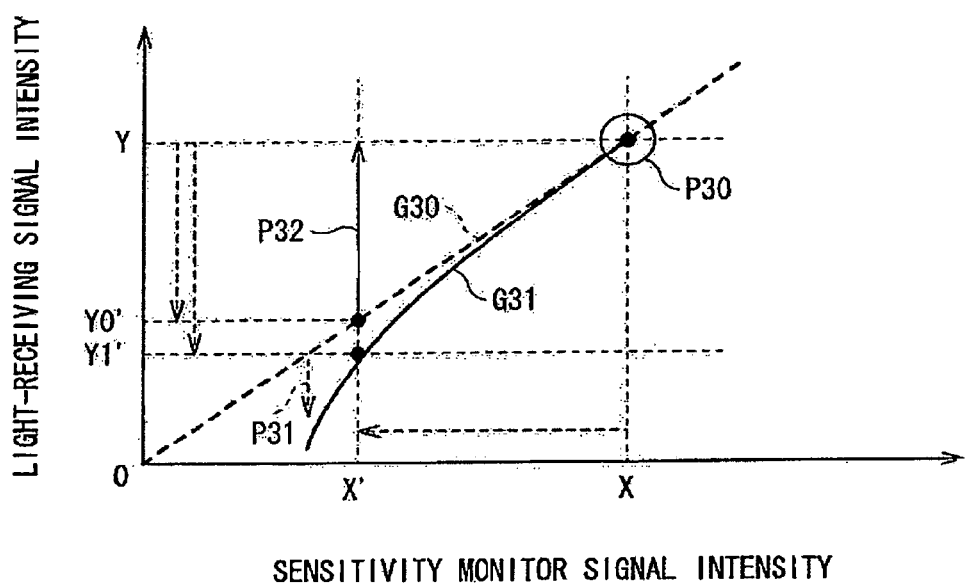
FIGS. 24A and 24B are plots for describing an example of a temperature correction process according to the second embodiment.
Figure 24B:
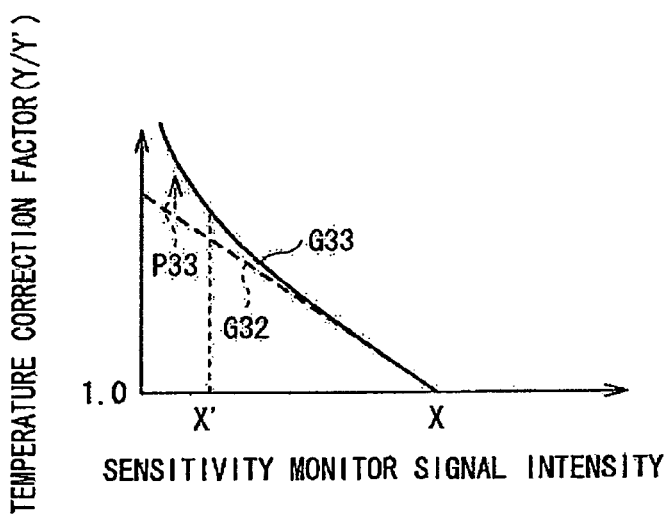

Therefore, in a sensitivity correction section 341, for example, as illustrated in FIG. 24B, a temperature correction table associated with the sensitivity monitor signal intensity and a temperature correction factor (Y/Y') in temperature correction is used to perform temperature correction by multiplying the light-receiving signal by the temperature correction factor.

More specifically, first, in the case illustrated in FIG. 23(B) (in the case where the rate of change at each temperature is uniform), as indicated by an dashed arrow in FIG. 24A, the case where the sensitivity monitor signal intensity and the light-receiving signal intensity are changed from a set point P30 (X,Y) described in the first embodiment is considered. In this case, the ratio between the light-receiving signal intensity and the sensitivity monitor signal intensity is uniform (the rate of change at each temperature is uniform), so the set point is changed to (X', Y0') along a proportional straight line G30 in the drawing. Therefore, temperature correction is performed by returning a target output value Y0' of the light-receiving signal intensity to a target output value Y as indicated by an arrow P32 in the drawing. In a temperature correction table illustrated in FIG. 24B, this temperature correction corresponds to performing temperature correction using the temperature correction factor (Y/Y') indicated by a straight line G32.

On the other hand, in the case illustrated in FIG. 23(C) (in the case where the rate of change at temperatures are different), the case where the sensitivity monitor signal intensity and the light-receiving signal intensity are changed from the set point P30 (X,Y) as indicated by a dashed arrow in FIG. 24A is considered. In this case, the ratio between the light-receiving signal intensity and the sensitivity monitor signal intensity are changed (the rates of change at temperatures are different) (refer to an arrow P31 in the drawing), so the set point is changed to (X',Y1') along a curve G31 in the drawing. Therefore, temperature correction is performed by returning a target output value Y1' of the light-receiving signal intensity to a target output value Y as indicated by an arrow P32 in the drawing. In the temperature correction table in FIG. 24B, the temperature correction corresponds to performing temperature correction using the temperature correction factor (Y/Y') indicated by a curve G33 (refer to an arrow P33 in the drawing).

As described above, in the embodiment, in the sensitivity correction section 341, temperature correction is performed on the light-receiving signal in consideration of changes in the intensities of the light-receiving signal and the sensitivity monitor signal due to temperature fluctuation so as to cancel out these changes in the intensities of the light-receiving signal and the sensitivity monitor signal. Therefore, even if the signal intensity is changed due to environmental temperature fluctuation, light-receiving signals with a uniform intensity are obtainable from a single external proximity object. Therefore, object information about the external proximity object is obtained based on the light-receiving signals also subjected to such temperature correction, thereby a proximity object such as a finger is detectable with higher accuracy.

Moreover, the sensitivity monitor sensor 35 also functions as the temperature sensor, so it is not necessary to separately arrange a temperature sensor which will be described below, so manufacturing costs are allowed to be reduced.

Modification (Modification 1) of Second Embodiment

Figure 25:
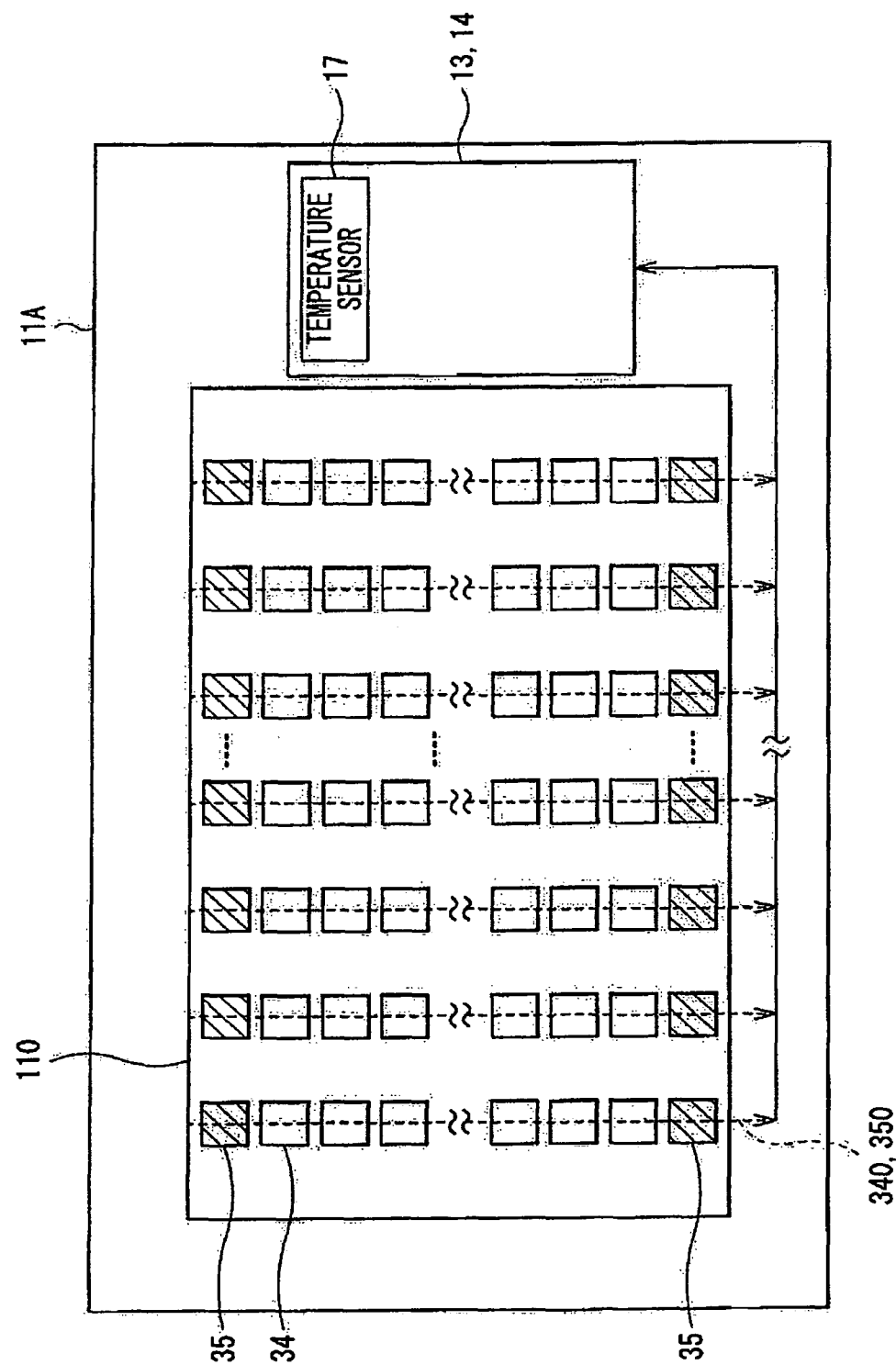
FIG. 25 is a schematic plan view of a brief configuration of an input/output panel according to a modification (Modification 1) of the second embodiment.
Figure 26:
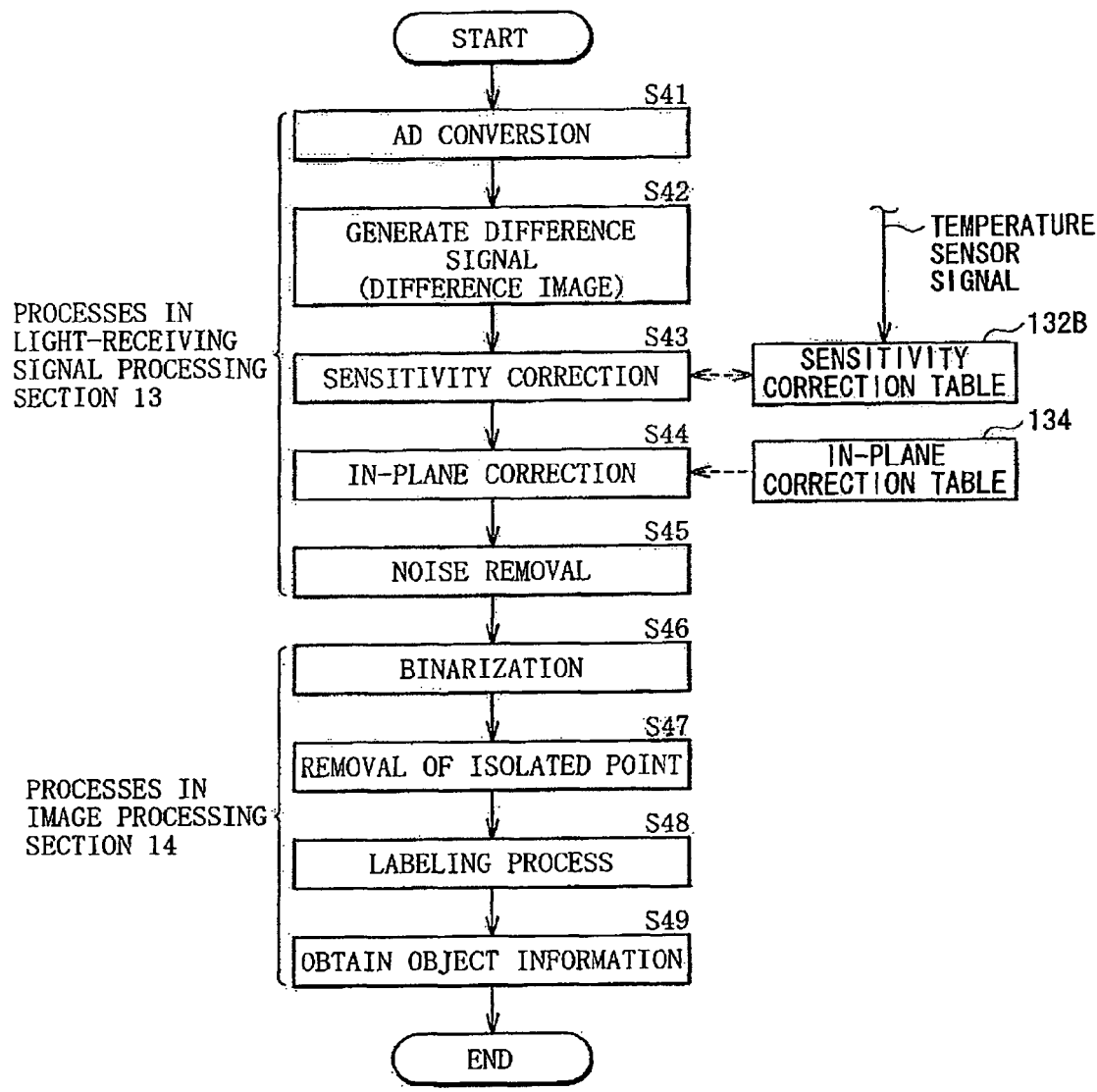
FIG. 26 is a flow chart illustrating a process of obtaining object information according to Modification 1.

For example, as in the case of an input/output panel 11A illustrated in FIG. 25, a temperature sensor 17 may be separately arranged in the light-receiving signal processing section 13 and the image processing section 14. In such an input/output panel 11A, for example, a process of obtaining object information is allowed to be performed as illustrated in FIG. 26. In other words, in a sensitivity correction process corresponding to step S43, a temperature sensor signal detected by the temperature sensor 17 is inputted into the sensitivity correction table 132B. Thereby, appropriate sensitivity correction is performed (an appropriate sensitivity correction gain GAIN is selected) according to environmental temperature detected by the temperature sensor.

In addition, among steps S41 to S49 in FIG. 26, processes (the steps S41, S42 and S44 to S49) except for the above-described step S43 are the same as those in the steps S21, S22 and S24 to S29 in FIG. 14 (the first embodiment), and will not be further described.

Modification (Modification 2) of Second Embodiment

Figure 27:
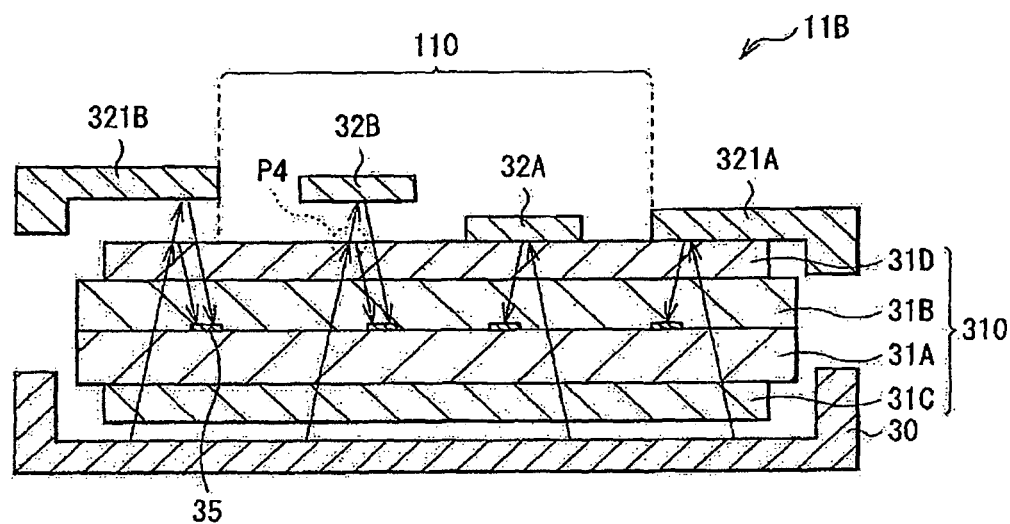
FIG. 27 is a schematic sectional view of an example of a brief configuration of an input/output panel according to a modification (Modification 2) of the second embodiment.
Figure 28A:
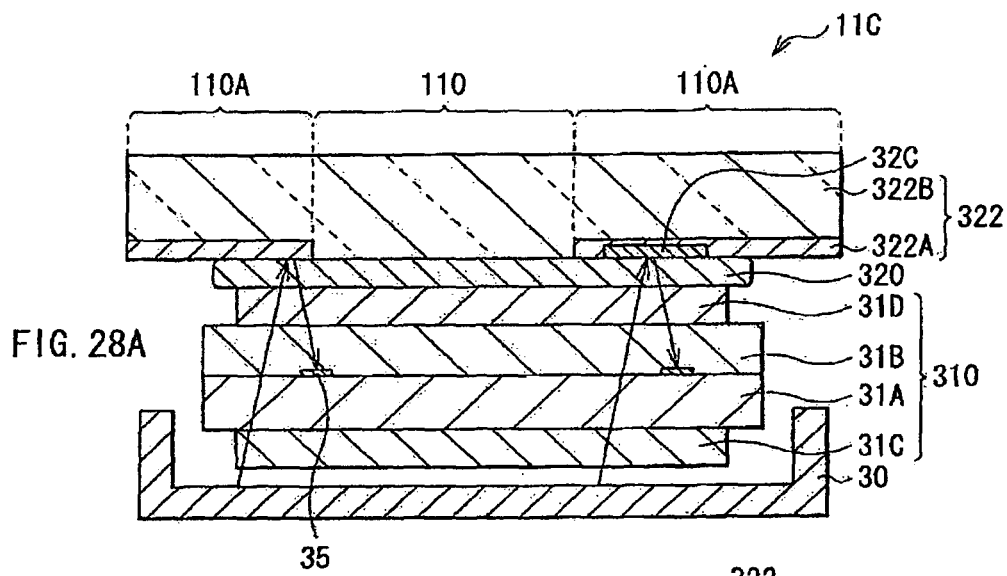
FIGS. 28A and 28B are schematic views of another example of the brief configuration of the input/output panel according to Modification 2.

FIG. 27 illustrates a schematic sectional view of a brief configuration of an example (an input/output panel 11B) of an input/output panel according to a modification (Modification 2) of the second embodiment. Moreover, FIG. 28A illustrates a schematic sectional view of a brief configuration of another example (an input/output panel 11C) of the input/output panel according to the modification. In addition, like components are denoted by like numerals as of the first and second embodiments and will not be further described.

The input/output panel 11B illustrated in FIG. 27 includes the backlight 30, the liquid crystal panel 310, frames 321A and 321B and reflecting plates 32A and 32B.

The liquid crystal panel 310 includes a TFT substrate 31A including the above-described transparent substrate 311 and the above-described insulating layer 313 to 315, the liquid crystal layer 316 (not illustrated), a CF substrate including the above-described transparent substrate 312 and a color filter (CF) (not illustrated), and the sensitivity monitor sensor 35. The liquid crystal panel 310 also includes a polarization plate 31C arranged on a side close to the backlight 30 of the TFT substrate 31A and a polarization plate 31D arranged on a side close to the frames 321A and 321B of the CF substrate 31B.

The frames 321A and 321B are frames arranged in end regions of the liquid crystal panel 310, and in this case, as indicated by arrows in the drawing, the frames 321A and 321B are allowed to reflect light (detection light) from the backlight 30. The frame 321A is arranged in contact with the polarization plate 31D, and the frame 321B is arranged on the polarization plate 31D with an air layer in between.

The reflecting plates 32A and 32B allow light (detection light) from the backlight 30 to enter into the sensitivity monitor sensor 35 as indicated by arrows in the drawing, and are arranged in an effective display region 110 of the input/output panel 11B. More specifically, the reflecting plate 32A is arranged in contact with the polarization plate 31D, and the reflecting plate 32B is arranged on the polarization plate 31D with an air layer in between.

On the other hand, the input/output panel 11C illustrated in FIG. 28A includes the backlight 30, the above-described liquid crystal panel 310, a resin layer 320 and a cover plate 322. The resin layer 320 is arranged between the liquid crystal panel 310 and the cover plate 322.

Figure 28B:
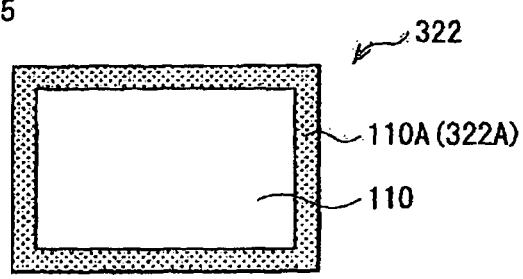

The cover plate 322 includes a cover glass 322B as a base and a light-shielding section 322A (refer to a plan view illustrated in FIG. 28B) forming a light-shielding region (a frame region) 110A positioned on the edge of the effective display region 10 in the input/output panel 11C. The cover plate 322 also includes a reflecting plate 32C arranged in the light-shielding section 322A (the light-shielding region 110A). More specifically, the reflecting plate 32C is arranged on the polarization plate 31D with the resin layer 320 in between. As in the case of the above-described reflecting plates 32A and 32B, the reflecting plate 32C is also allowed to reflect light (detection light) from the backlight 30 to enter into the sensitivity monitor sensor 35. In addition, the above-described light-shielding section 322A is also allowed to reflect the light (detection light) from the backlight 30 to enter into the sensitivity monitor sensor 35. Thus, the sensitivity monitor sensor 35 in the modification monitors the intensity of light (detection light) from the backlight 30 obtained through the polarization plates 31C and 31D.

Figure 29:
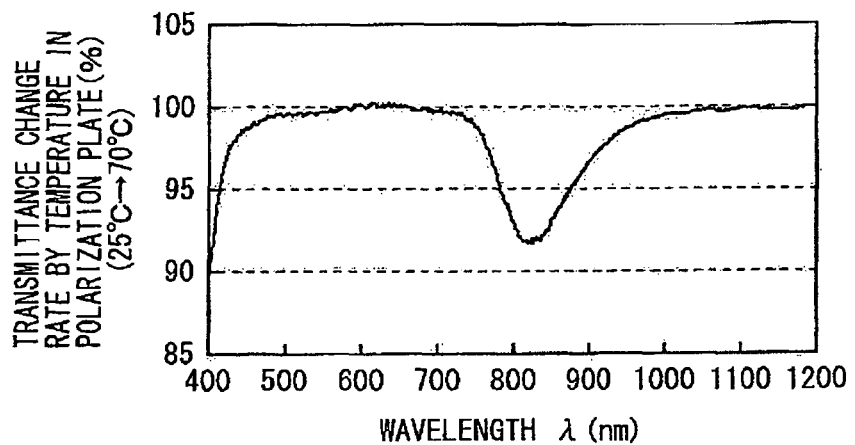
FIG. 29 is a plot illustrating an example of wavelength dependence of transmittance change rate by temperature in a polarization plate illustrated in FIG. 27 and FIGS. 28A and 28B.
Figure 30:
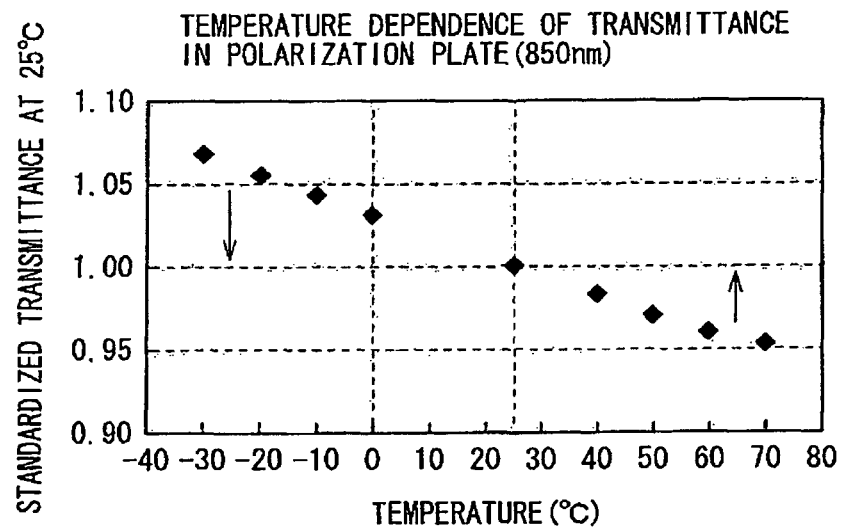
FIG. 30 is a plot illustrating an example of temperature dependence of transmittance in the polarization plate illustrated in FIG. 27 and FIGS. 28A and 28B (wavelength: 850 nm).

In this case, the polarization plates 31C and 31D illustrated in FIG. 27 and FIG. 28A each have temperature dependence of transmittance for near-infrared light (specifically light in a wavelength region of approximately 720 to 1000 nm) as illustrated in, for example, FIGS. 29 and 30. More specifically, for example, as illustrated in FIG. 29, in the case where the temperature is changed from room temperature (25° C.) as a reference to 70° C., transmittance change rates by temperature in the polarization plates 31C and 31D are large specifically for the above-described wavelength region of near-infrared light (in this case, approximately 8% at maximum). Moreover, for example, as illustrated in FIG. 30, when the temperature dependence of transmittance standardized at room temperature (25° C.) (standardized transmittance) for light in a wavelength of 850 nm corresponding to the near-infrared light is examined, it is confirmed that the standardized transmittance is monotonically decreased with an increase in temperature. More specifically, when the temperature increases from −40° C. to 80° C., the value of the standardized transmittance is monotonically decreased from +7% to −5%.

Thus, the polarization plates 31C and 31D in the input/output panels 11B and 11C has large temperature dependence of transmittance for near-infrared light, so in the case where near-infrared light is used as the detection light from the backlight 30, it is difficult to accurately detect the proximity object. In other words, due to the temperature dependence of transmittance in such polarization plates 31C and 31D, the intensity of the light-receiving signal obtained from the main sensor 34 and the intensity of the sensitivity monitor signal obtained from the sensitivity monitor sensor 35 are largely changed according to the environmental temperature.

Therefore, in the modification, in the sensitivity correction section 341, in consideration of changes in the intensities of the light-receiving signal and the sensitivity monitor signal caused by the temperature dependence of transmittance in such polarization plates 31C and 31D, temperature correction is performed as in the case of the second embodiment.

At this time, detection light (near-infrared light) from the backlight 30 reflected from the reflecting plates 32A, 32B and 32C illustrated in, for example, FIG. 27 and FIG. 28A enters into the sensitivity monitor sensor 35. However, for example, as illustrated in FIG. 27, the frames 321A and 321B or the like may be used instead of the reflecting plates, and detection light (near-infrared light) from the backlight 30 reflected from the frames 321A and 321B may enter into the sensitivity monitor sensor 35. Moreover, for example, as illustrated in FIG. 28A, the light-shielding section 322A in the cover plate 322 may be used instead of the reflecting plates, and detection light (near-infrared light) from the backlight reflected from the light-shielding section 322A may enter into the sensitivity monitor sensor 35. Further, as indicated by a reference numeral P4 in FIG. 27, for example, reflection from an interface between the polarization plate 31D and the air layer may be used, and detection light (near-infrared light) from the backlight 30 reflected from the interface may enter into the sensitivity monitor sensor 35. In addition, FIG. 28A illustrates an example in which the resin layer 320 is arranged between the polarization plate 31D and the cover plate 322. However, for example, an air layer may be arranged between the polarization plate 31D and the cover plate 322.

Thus, in the modification, in the sensitivity correction section 341, temperature correction is performed in consideration of changes in the intensities of the light-receiving signal and sensitivity monitor signal caused by temperature dependence of transmittance in the polarization plates 31C and 31D, so the same effects as those in the second embodiment are obtainable by the same functions as those in the second embodiment. In other words, even if the signal intensity is changed due to environmental temperature fluctuation, the light-receiving signals with a uniform intensity are obtainable from a single external proximity object. Therefore, object information about the external proximity object is obtained based on the light-receiving signals also subjected to such temperature correction, thereby a proximity object such as a finger is detectable with higher accuracy. In addition, in the modification, the case where temperature correction is performed in consideration of changes in intensities of the light-receiving signal and the intensity monitor signal caused by temperature dependence of transmittance in the polarization plates 31C and 31D is described. However, adaptive sensitivity correction described in the above-described first embodiment may be applicable. Thereby, even if in the polarization plates 31C and 31D, a change in light reception sensitivity due to time-dependent degradation or the like or individual variations in light reception sensitivity occur, light-receiving signals with a uniform intensity are obtainable from a single external proximity object.

3. Common Modifications (Modifications 3 to 5) of the First and Second Embodiments Next, common modifications (Modifications 3 to 5) of the first and second embodiments will be described below. In addition, like components are denoted by like numerals as of the first and second embodiments and will not be further described.

Modification 3

Figure 31:
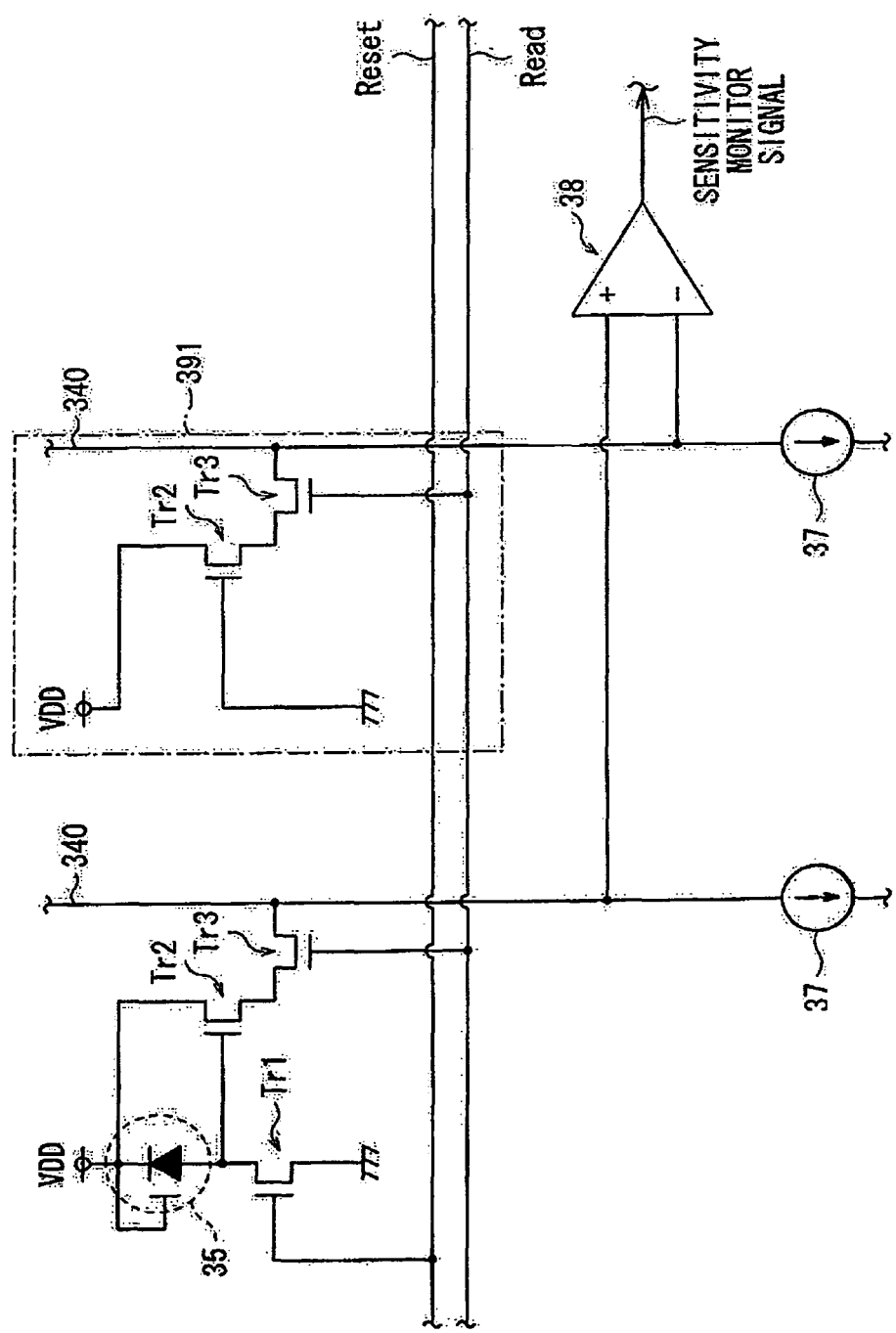
FIG. 31 is a circuit diagram of a configuration of a light reception circuit including a sensitivity monitor sensor in an input/output panel according to a modification (Modification 3) of the invention.

FIG. 31 illustrates a circuit configuration of a light reception circuit including the sensitivity correction sensor 35 in an input/output panel according to Modification 3 of the invention. The light reception circuit of the modification is a circuit including a reference circuit 391 for subtracting an offset component from the sensitivity monitor signal in the light reception circuit in the first embodiment illustrated in FIG. 6.

In the reference circuit 391, transistors Tr2 and Tr3 are arranged. A source of the transistor Tr2 is connected to the power source VDD, and a drain of the transistor Tr2 is connected to a drain of the transistor Tr3, and a gate of the transistor Tr2 is grounded. Moreover, a gate of the transistor Tr3 is connected to the read signal line Read, and a source of the transistor Tr3 is connected to the light-receiving signal output line 340. Moreover, in the amplifier 38, the light-receiving signal output line 340 on the sensitivity monitor sensor 35 side is connected to the noninverting input terminal, and the light-receiving signal output line 340 on the reference circuit 391 side is connected to the inverting input terminal, and signals from these output lines are differentially amplified.

In the modification with such a configuration, the offset component in the sensitivity monitor signal (an offset component in a source follower circuit by the transistors Tr2 and Tr3) is allowed to be subtracted. Therefore, such an offset component is allowed to be subtracted without producing the difference image C described in the first embodiment.

Modification 4

Figure 32:
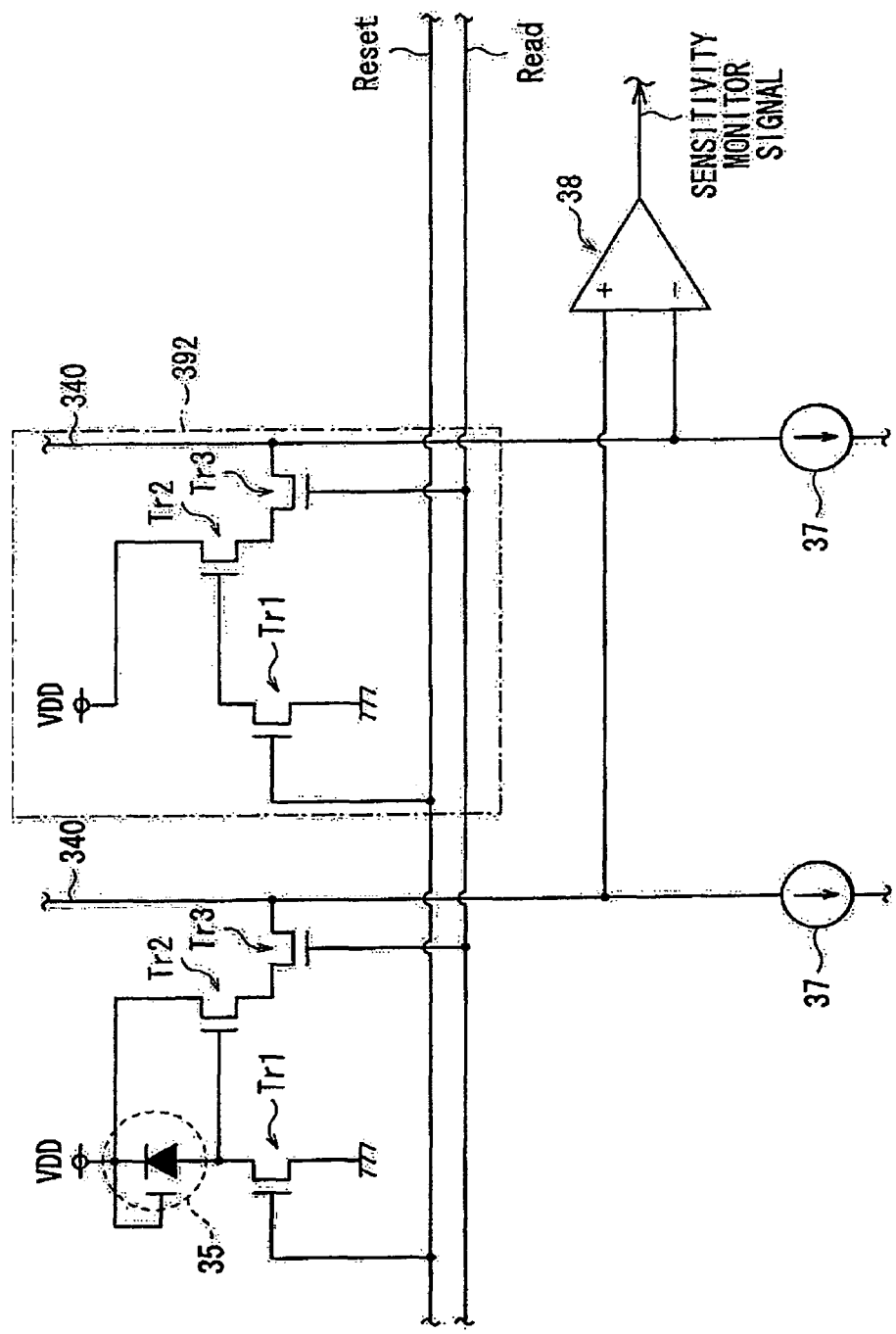
FIG. 32 is a circuit diagram of a configuration of a light reception circuit including a sensitivity monitor sensor in an input/output panel according to another modification (Modification 4) of the invention.

FIG. 32 illustrates a circuit configuration of a light reception circuit including the sensitivity correction sensor 35 in an input/output panel according to Modification 4 of the invention. In the light reception circuit of the modification, a reference circuit 392 is arranged instead of the reference circuit 391 in the light reception circuit according to Modification 3 illustrated in FIG. 31.

The reference circuit 392 has a configuration in which a transistor Tr1 is added between the gate of the transistor Tr2 and the ground in the reference circuit 391. In other words, the reference circuit 392 has the same configuration as a peripheral circuit of the sensitivity monitor sensor 35 except that the sensitivity monitor sensor 35 is not present.

In the modification with such a configuration, compared to the above-described Modification 3, the configuration of the reference circuit is more similar to the peripheral circuit of the sensitivity monitor sensor 35, so the offset component in the sensitivity monitor signal is allowed to be subtracted with higher accuracy.

Modification 5

Figure 33:
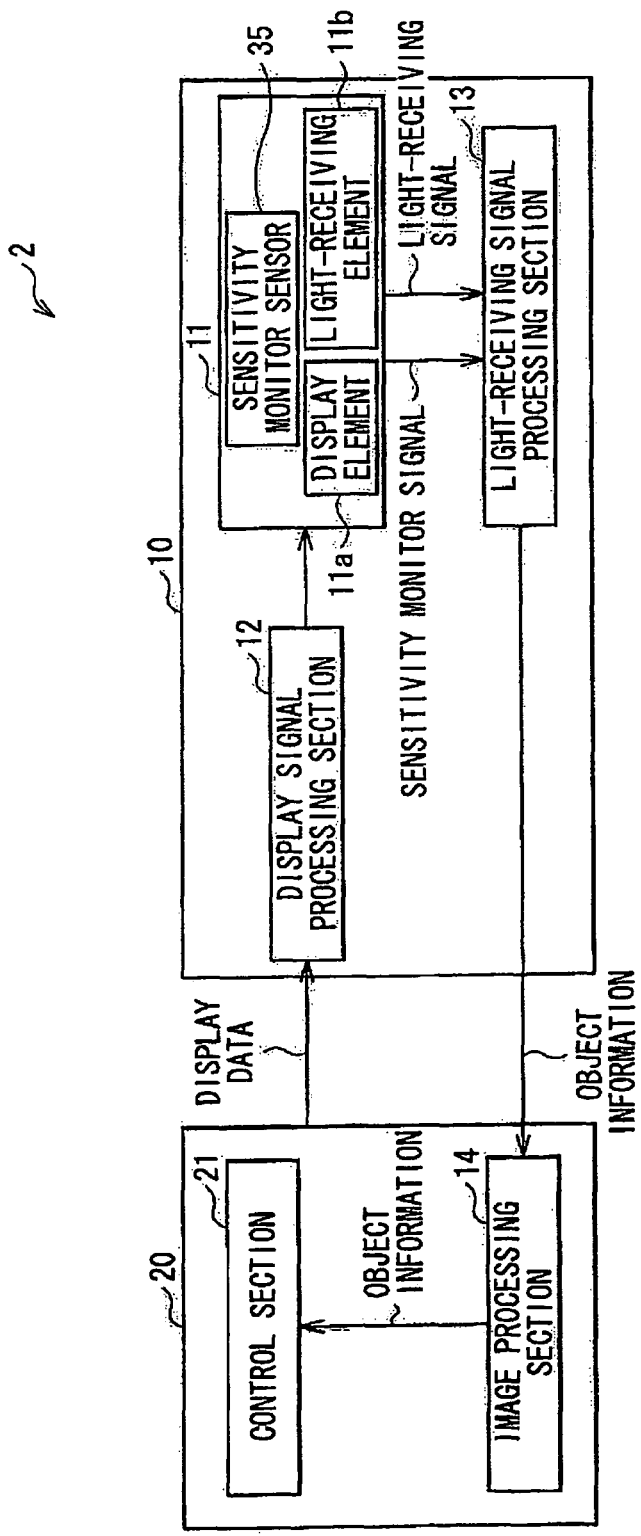
FIG. 33 is a block diagram of a configuration of an information input/output device according to still another modification (Modification 5) of the invention.

FIG. 33 illustrates a block configuration of an information input/output device 2 according to Modification 5 of the invention. The information input/output device 2 is distinguished from the information input/output device 1 described in the first embodiment by the fact that the image processing section 14 is arranged in the electronic device body 20. In other words, in the information input/output device 2, the display signal processing section 12, the input/output panel 11 and the light-receiving signal processing section 13 are arranged in the display 10, and the control section 21 and the image processing section 14 are arranged in the electronic device body 20. Even in such an information input/output device 2, the same effects as those in the information input/output device 1 according to the above-described embodiment are obtainable.

4. Application Examples to Electronic Devices

Next, referring to FIG. 34 to FIGS. 38A to 38G, application examples of the information input/output devices described in the above-described embodiments and above-described modifications will be described below. The information input/output devices according to the above-described embodiments and the like are applicable to electronic devices in any fields such as televisions, digital cameras, notebook personal computers, portable terminal devices such as cellular phones, and video cameras. In other words, the information input/output devices according to the above-described embodiments and the like are applicable to electronic devices displaying a picture signal inputted from outside or a picture signal produced inside as an image or a picture in any fields.

APPLICATION EXAMPLE 1

Figure 34:
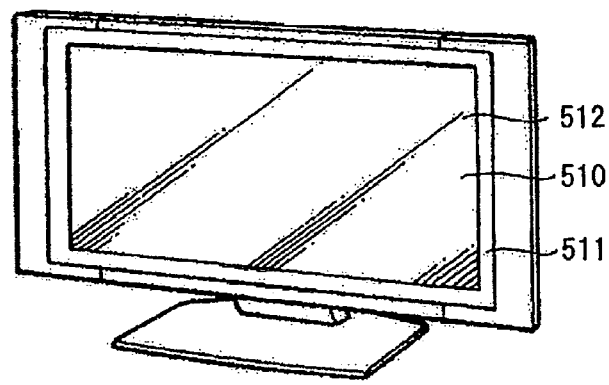
FIG. 34 is an external perspective view of Application Example 1 of an information input/output device according to respective embodiments of the invention.

FIG. 34 illustrates an appearance of a television to which the information input/output device according to any of the above-described embodiments and the like is applied. The television has, for example, a picture display screen section 510 including a front panel 511 and a filter glass 512. The picture display screen section 510 is configured of the information input/output device according to any of the above-described embodiments and the like.

APPLICATION EXAMPLE 2

Figure 35A:
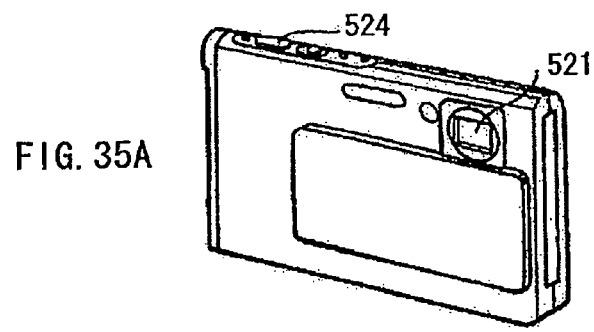
FIGS. 35A and 35B are an external perspective view from the front side of Application Example 2 and an external perspective view from the back side of Application Example 2, respectively.
Figure 35B:
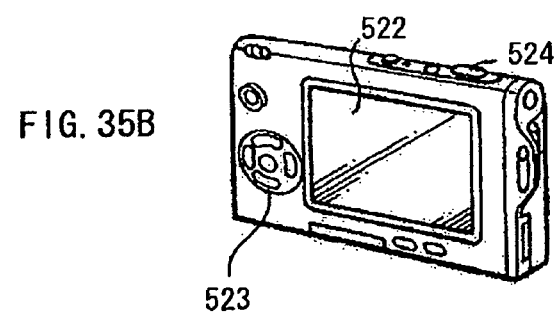

FIGS. 35A and 35B illustrate appearances of a digital camera to which the information input/output device according to any of the above-described embodiments and the like is applied. The digital camera has, for example, a light-emitting section for a flash 521, a display section 522, a menu switch 523, and a shutter button 524. The display section 522 is configured of the information input/output device according to any of the above-described embodiments and the like.

APPLICATION EXAMPLE 3

Figure 36:
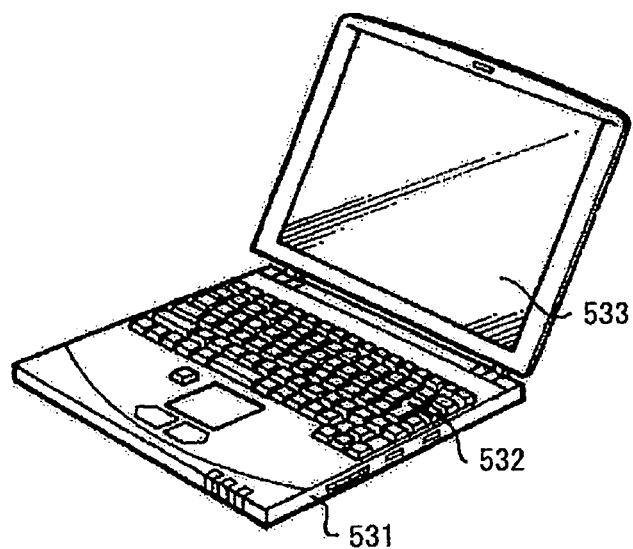
FIG. 36 is an external perspective view of Application Example 3.

FIG. 36 illustrates an appearance of a notebook personal computer to which the information input/output device according to any of the above-described embodiments and the like is applied. The notebook personal computer has, for example, a main body 531, a keyboard 532 for operation of inputting characters and the like, and a display section 533 for displaying an image. The display section 533 is configured of the information input/output device according to any of the above-described embodiments and the like.

APPLICATION EXAMPLE 4

Figure 37:
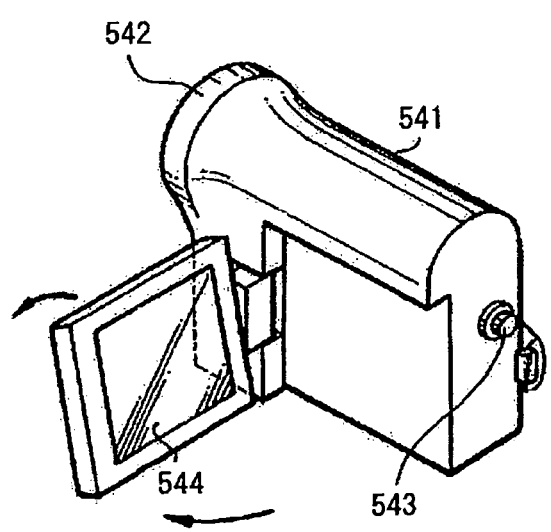
FIG. 37 is an external perspective view of Application Example 4.

FIG. 37 illustrates an appearance of a video camera to which the information input/output device according to any of the above-described embodiments and the like is applied. The video camera has, for example, a main body 541, a lens for shooting an object 542 arranged on a front surface of the main body 541, a shooting start/stop switch 543, and a display section 544. The display section 544 is configured of the information input/output device according to any of the above-described embodiments and the like.

APPLICATION EXAMPLE 5

FIGS. 38A to 38G illustrate appearances of a cellular phone to which the information input/output device according to any of the above-described embodiments and the like is applied. The cellular phone is formed by connecting, for example, a top-side enclosure 710 and a bottom-side enclosure 720 to each other by a connection section (hinge section) 730. The cellular phone has a display 740, a sub-display 750, a picture light 760, and a camera 770. The display 740 or the sub-display 750 is configured of the information input/output device according to any of the above-described embodiments and the like.

Although the present invention is described referring to the embodiment, the invention is not limited thereto, and may be variously modified.

For example, in the above-described embodiments and the like, both of sensitivity correction and in-plane correction are performed. However, the in-plane correction may not be performed, and only the sensitivity correction may be performed. Moreover, the order or the like in which the in-plane connection and the sensitivity correction are performed is not limited to that described in the above-described embodiments and the like.

Moreover, in the above-described embodiments, the case where a plurality of sensitivity monitor sensors 35 are arranged in the input/output panel is described. However, one or more sensitivity monitor sensors 35 may be arranged in the input/output panel.

Further, in the above-described embodiments and the like, the case where the control section 21 is arranged in the electronic device body 20 is described. However, the control section 21 may be arranged in the display 10.

Moreover, in the above-described embodiments and the like, one light reception cell CR is arranged for one light emission cell CW, but one light reception cell CR may be allocated to a plurality of light emission cells CW.

Further, in the above-described embodiments and the like, the input/output panel configured of a liquid crystal panel including the backlight 30 is described. However, a backlight for display may also serves as a light source for detection, or a light source (an illumination light source) for detection only may be arranged. Moreover, in the case where the light source for detection is arranged, light in a wavelength region other than a visible light region (for example, infrared light) is more preferably used.

In the information input/output devices 1 and 2 described above, a configuration using the liquid crystal display panel as the input/output panel is described. However, the information input/output device of the invention may have a configuration using an organic electroluminescence (EL) panel or the like as the input/output panel. An organic EL element is a display element having characteristics of, when a forward bias voltage is applied, emitting light, and, when a backward bias voltage is applied, receiving light to generate a current. Therefore, the organic EL element includes a display element 11a and a light-receiving element 11b. In this case, the input/output panel is configured by arranging the organic EL element for each pixel, and when the forward bias voltage is applied to each organic EL element to allow each organic EL element to emit light, an image is displayed, and when the backward bias voltage is applied to other organic EL elements, the organic EL elements are allowed to receive reflected light.

The invention is described referring to the information input/output device which includes the input/output panel including a plurality of display elements 11a and a plurality of light-receiving elements 11b (having a detection function of detecting the external proximity object and an image display function) as an example. However, the invention is applicable to an information input device (an image pickup device) which includes an input panel including a plurality of light-receiving elements 11b (having a detection function of detecting the external proximity object). In such an input panel, a light source (an illumination light source) emitting detection light for detecting the external proximity object is arranged. In other words, such an input panel and an output panel (a display panel) displaying an image based on display data produced by the control section 21 may be separately arranged.

The processes described in the above-described embodiments and the like may be performed by hardware or software. In the case where the processes are performed by software, a program forming the software is installed in a general-purpose computer or the like. Such a program may be stored in a recording medium mounted in the computer in advance.

The present application contains subject matter related to that disclosed in Japanese Priority Patent Application JP 2009-020676 filed in the Japan Patent Office on Jan. 30, 2009, the entire content of which is hereby incorporated by references.

It should be understood by those skilled in the art that various modifications, combinations, sub-combinations and alterations may occur depending on design requirements and other factors insofar as they are within the scope of the appended claims or the equivalents thereof.

What is claimed is:

1. An information input device comprising:
an input panel including an illumination light source, a plurality of first light-receiving elements and one or more second light-receiving elements, the illumination light source emitting detection light for detecting an external proximity object, the plurality of first light-receiving elements receiving detection light emitted from the illumination light source and then reflected from the external proximity object, the second light-receiving elements monitoring the intensity of the detection light;

a correction section performing adaptive sensitivity correction on light-receiving signals obtained by the first light-receiving elements through use of an intensity monitor signal of detection light obtained by the second light-receiving element, so that the light-receiving signals output from the correction section maintain a substantially uniform intensity; and an image processing section obtaining object information about one or more of the position, shape and size of the external proximity object on the basis of a picked-up image obtained from the light-receiving signals output from the correction section, wherein the second light-receiving element has a light-shielding region for preventing light from directly illuminating the second light-receiving element, and the adaptive sensitivity correction includes generating a difference signal from the light receiving signal, and generating a sensitivity correction signal from the difference signal with a sensitivity correction table in addition to the intensity monitor signal.

2. The information input device according to claim 1, wherein
while the correction section maintains a ratio between the intensity of the intensity monitor signal and the light-receiving signals from a single external proximity object, the correction section performs the sensitivity correction by multiplying the light-receiving signals by a sensitivity correction gain according to the intensity of the intensity monitor signal so that the intensities of the light-receiving signals reach a target value.

3. The information input device according to claim 2, wherein the correction section performs the sensitivity correction using a sensitivity correction table associated with the intensity of the intensity monitor signal corresponding to a target value for the intensities of the light-receiving signals set in a predetermined reference reflecting plate and the sensitivity correction gain.

4. The information input device according to claim 3, wherein the sensitivity correction table includes an inversely proportional curve with respect to a proportional straight line as a gradient representing a ratio between the intensity of the sensitivity monitor signal and the intensity of the light-receiving signal from the reference reflecting plate.

5. The information input device according to claim 1, wherein the correction section further performs temperature correction on the light-receiving signals so as to cancel out changes in the intensities of the light-receiving signals and the intensity monitor signal caused by temperature fluctuation.

6. The information input device according to claim 5, wherein the correction section performs the temperature correction using a temperature correction table associated with the intensity of the intensity monitor signal and a temperature correction factor in the temperature correction by multiplying the light-receiving signals by the temperature correction factor.

7. The information input device according to claim 5, wherein the input panel further includes a temperature sensor, and
the correction section performs the temperature correction according to a temperature detected by the temperature sensor.

8. The information input device according to claim 1, wherein the input panel is an input/output panel including the plurality of first light-receiving elements and a plurality of display elements in a display surface,
the input/output panel includes a polarization plate arranged on the plurality of the display elements, and
the second light-receiving element monitors the intensity of the detection light obtained through the polarization plate.

9. The information input device according to claim 8, wherein the input/output panel has an effective display region and a light-shielding region arranged at an outer edge of the effective display region, and
a reflecting plate for allowing the detection light from the illumination light source to be reflected to enter into the second light-receiving element is arranged in the light-shielding region.

10. The information input device according to claim 8, wherein the detection light is near-infrared light.

11. The information input device according to claim 1, wherein the input panel is an input/output panel which includes the plurality of first light-receiving elements and a plurality of display elements in a display surface, the correction section further performs in-plane correction on a light-receiving signal from each of the first light-receiving elements using an in-plane correction table associated with an in-plane correction factor including a display surface in-plane distribution according to both of a display surface in-plane intensity distribution of light emitted from the display surface and an in-plane light reception sensitivity distribution of the plurality of light-receiving devices, and a position on the display surface.

12. The information input device according to claim 11, wherein the display surface in-plane distribution of the in-plane correction factor is an inverted distribution of a combined distribution including the display surface in-plane intensity distribution and the in-plane light reception sensitivity distribution, and
the correction section performs the in-plane correction by multiplying the light-receiving signal from each of the first light-receiving elements by a corresponding in-plane correction factor.

13. The information input device according to claim 12, wherein the in-plane correction table is formed by associating each of a plurality of blocks into which the plurality of first light-receiving elements are divided with the in-plane correction factor.

14. The information input device according to claim 13, wherein
the in-plane correction factor is a reciprocal of a normalized value obtained by normalizing each light reception average value, which is obtained by averaging light-receiving signals from the first light-receiving elements in each of the blocks when brightening the display surface in a state in which a reference reflecting plate is arranged so as to face the display surface.

15. The information input device according to claim 12, wherein the in-plane correction table is formed in association with the in-plane correction factor in each of the first light-receiving elements.

16. The information input device according to claim 15, wherein
the in-plane correction factor is a reciprocal of a normalized value obtained by normalizing the value of a light-receiving signal, which is obtained from each of the first light-receiving elements when brightening the display surface in a state in which a reference reflecting plate is arranged so as to face the display surface.

17. The information input device according to claim 1, wherein the input panel includes a light reception circuit including the second light-receiving element, and a reference circuit for subtracting an offset noise component in the intensity monitor signal is arranged in the light reception circuit.

18. The information input device according to claim 1, wherein the detection light is infrared light.

19. The information input device according to claim 1, wherein the difference signal is obtained between a first image obtained while the detection light is not emitted from the illumination light source and a second image obtained while the detection light is emitted from the illumination light source.

20. The information input device according to claim 1, wherein the plurality of first light-receiving elements are arranged in matrix in an effective display region of the input panel, and the second light-receiving elements are disposed at both ends of each column of the first light-receiving elements in the matrix in the effective display region.

21. An information input/output device comprising:

an input/output panel including a plurality of display elements arranged in a display surface, a plurality of first light-receiving elements and one or more second light-receiving elements, the plurality of first light-receiving elements arranged in the display surface and receiving detection light emitted from the display surface and then reflected from an external proximity object, the second light-receiving elements for monitoring the intensity of the detection light;

a correction section performing adaptive sensitivity correction on light-receiving signals obtained by the first light-receiving elements through use of an intensity monitor signal of detection light obtained by the second light-receiving element, so that the light-receiving signals output from the correction section maintain a substantially uniform intensity; and an image processing section obtaining object information about one or more of the position, shape and size of the external proximity object on the basis of a picked-up image obtained from the light-receiving signals output from the correction section, wherein the second light-receiving element has a light-shielding region for preventing light from directly illuminating the second light-receiving element, and the adaptive sensitivity correction includes generating a difference signal from the light receiving signal, and generating a sensitivity correction signal from the difference signal with a sensitivity correction table in addition to the intensity monitor signal.

22. An electronic device comprising an information input device, wherein the information input device includes:

an input panel including an illumination light source, a plurality of first light-receiving elements and one or more second light-receiving elements, the illumination light source emitting detection light for detecting an external proximity object, the plurality of first light-receiving elements receiving detection light emitted from the illumination light source and then reflected from the external proximity object, the second light-receiving elements for monitoring the intensity of the detection light, a correction section performing adaptive sensitivity correction on light-receiving signals obtained by the first light-receiving elements through use of an intensity monitor signal of detection light obtained by the second light-receiving element, so that the light-receiving signals output from the correction section maintain a substantially uniform intensity and an image processing section obtaining object information about one or more of the position, shape and size of the external proximity object on the basis of a picked-up image obtained from the light-receiving signals output from the correction section, wherein the second light-receiving element has a light-shielding region for preventing light from directly illuminating the second light-receiving element, and the adaptive sensitivity correction includes generating a difference signal from the light receiving signal, and generating a sensitivity correction signal from the difference signal with a sensitivity correction table in addition to the intensity monitor signal.

* * * * *